United States Patent
Stacey et al.

(10) Patent No.: US 9,516,615 B2
(45) Date of Patent: Dec. 6, 2016

(54) SELECTION OF SYNCHRONIZATION STATIONS IN A PEER-TO-PEER NETWORK ENVIRONMENT

(71) Applicant: Apple Inc., Cupertino, CA (US)

(72) Inventors: Robert J. Stacey, Portland, OR (US); Pierre B. Vandwalle, Sunnyvale, CA (US); Christiaan A. Hartman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 265 days.

(21) Appl. No.: 13/657,707

(22) Filed: Oct. 22, 2012

(65) Prior Publication Data

US 2013/0132502 A1   May 23, 2013

Related U.S. Application Data

(63) Continuation-in-part of application No. 13/625,752, filed on Sep. 24, 2012, now abandoned.

(60) Provisional application No. 61/561,736, filed on Nov. 18, 2011, provisional application No. 61/586,664, filed on Jan. 13, 2012, provisional application No. 61/666,547, filed on Jun. 29, 2012.

(51) Int. Cl.
*H04W 56/00* (2009.01)
*H04L 29/08* (2006.01)
*H04W 84/20* (2009.01)

(52) U.S. Cl.
CPC ...... *H04W 56/0015* (2013.01); *H04L 67/1095* (2013.01); *H04W 84/20* (2013.01)

(58) Field of Classification Search
CPC .................... H04N 21/4182; H04W 56/0015; H04L 67/1095
USPC ........................................................ 709/208
See application file for complete search history.

(56) References Cited

U.S. PATENT DOCUMENTS 5,022,046 A * 6/1991 Morrow, Jr. ............ H04J 13/00
370/342
5,247,650 A * 9/1993 Judd .................. G05B 19/4097
703/20

(Continued)

FOREIGN PATENT DOCUMENTS

EP    0615364 A1   9/1994
JP    H7-58688 A   3/1995

(Continued)

OTHER PUBLICATIONS

Chung et al., "The Design of Outsourcing Planning for Semiconductor Backend Turnkey Service", 2008.*

(Continued)

*Primary Examiner* — O. C. Vostal
(74) *Attorney, Agent, or Firm* — Sterne, Kessler, Goldstein & Fox P.L.L.C.

(57) ABSTRACT

A system, apparatus and method for selecting one or more synchronization stations, or masters, in a peer-to-peer communication environment. Synchronization (or sync) stations broadcast periodic synchronization frames to advertise future availability windows, during which devices rendezvous for discovery and communication. Devices that can act as sync stations advertise preference values, which indicate their preference or suitability for the role. All devices execute the same algorithm to sort the preference values and identify a root sync station and any number of branch sync stations; leaf devices synchronize with the root or a branch sync station. This passive synchronization scheme allows individual devices to conserve power, because they need not actively discover other devices and services, and can power off their radios for periods of time without sacrificing discoverability. Synchronization and peer-to-peer communication as provided herein coexist with other device demands, such as Bluetooth® operations and infrastructure-based communications.

20 Claims, 16 Drawing Sheets

(56) References Cited

U.S. PATENT DOCUMENTS

| | | | | |
|---|---|---|---|---|
| 5,426,633 | A * | 6/1995 | Tanaka | H04J 3/0626 370/350 |
| 5,831,848 | A * | 11/1998 | Rielly | G05B 19/0421 370/402 |
| 6,031,863 | A * | 2/2000 | Jusa | H04B 1/7156 370/338 |
| 6,134,234 | A * | 10/2000 | Kapanen | H04J 3/0641 331/14 |
| 6,192,230 | B1 | 2/2001 | van Bokhorst et al. | |
| 6,446,092 | B1 | 9/2002 | Sutter | |
| 6,721,315 | B1 * | 4/2004 | Xiong | H04L 49/254 370/389 |
| 7,280,557 | B1 * | 10/2007 | Biswas | H04L 29/12367 370/465 |
| 7,468,969 | B2 * | 12/2008 | Zuniga | H04W 76/023 370/338 |
| 7,522,639 | B1 * | 4/2009 | Katz | G01D 4/002 340/870.02 |
| 7,535,907 | B2 * | 5/2009 | Hussain | H04L 49/90 370/392 |
| 7,548,923 | B2 * | 6/2009 | Vasishth | G06F 17/30581 |
| 7,675,869 | B1 | 3/2010 | Anker et al. | |
| 7,802,001 | B1 * | 9/2010 | Petry | G06F 15/16 709/223 |
| 7,849,150 | B2 | 12/2010 | Loeebbert et al. | |
| 7,920,881 | B2 * | 4/2011 | Fullam | H04H 20/67 370/350 |
| 7,941,564 | B2 | 5/2011 | Gebhardt et al. | |
| 7,987,491 | B2 * | 7/2011 | Reisman | 725/112 |
| 8,190,680 | B2 | 5/2012 | Spilo et al. | |
| 8,239,479 | B2 | 8/2012 | Sagar et al. | |
| 8,374,140 | B2 * | 2/2013 | Hu | H04W 72/0426 370/329 |
| 8,570,898 | B1 | 10/2013 | Kopikare et al. | |
| 8,699,406 | B1 | 4/2014 | Charles et al. | |
| 8,798,019 | B2 | 8/2014 | Saito et al. | |
| 2002/0053985 | A1 * | 5/2002 | Nesbitt | G08G 1/123 340/994 |
| 2002/0065919 | A1 | 5/2002 | Taylor | |
| 2002/0103943 | A1 * | 8/2002 | Lo | H04L 29/06 710/2 |
| 2002/0133631 | A1 | 9/2002 | Yun | |
| 2002/0178292 | A1 * | 11/2002 | Mushkin | H04B 3/54 709/248 |
| 2003/0169722 | A1 * | 9/2003 | Petrus et al. | 370/347 |
| 2003/0172179 | A1 | 9/2003 | del Prado Pavon et al. | |
| 2004/0010623 | A1 | 1/2004 | Sher et al. | |
| 2004/0136392 | A1 * | 7/2004 | Diachina et al. | 370/431 |
| 2004/0223466 | A1 * | 11/2004 | Schrader | H04J 3/1605 370/321 |
| 2004/0255001 | A1 | 12/2004 | Oh et al. | |
| 2005/0079883 | A1 | 4/2005 | Khawand | |
| 2005/0105524 | A1 * | 5/2005 | Stevens | H04L 45/04 370/389 |
| 2006/0190521 | A1 | 8/2006 | Kojima | |
| 2006/0190553 | A1 | 8/2006 | Kojima | |
| 2006/0239333 | A1 * | 10/2006 | Albert et al. | 375/130 |
| 2006/0245454 | A1 * | 11/2006 | Balasubramanian | H04L 12/4625 370/509 |
| 2006/0246947 | A1 | 11/2006 | Fujii et al. | |
| 2006/0268744 | A1 | 11/2006 | Sakai et al. | |
| 2006/0286975 | A1 * | 12/2006 | Sugitani | H04M 1/0291 455/426.1 |
| 2007/0050240 | A1 * | 3/2007 | Belani | G08G 1/14 705/13 |
| 2007/0098116 | A1 * | 5/2007 | Kim et al. | 375/343 |
| 2007/0160055 | A1 * | 7/2007 | Takahashi | 370/395.2 |
| 2007/0198740 | A1 | 8/2007 | Peters et al. | |
| 2008/0040511 | A1 | 2/2008 | Messer et al. | |
| 2008/0068217 | A1 * | 3/2008 | Van Wyk | G01D 4/004 340/870.11 |
| 2008/0107218 | A1 | 5/2008 | Geissler et al. | |
| 2008/0168185 | A1 * | 7/2008 | Robbin et al. | 709/248 |
| 2008/0240072 | A1 | 10/2008 | Bykovnikov | |
| 2008/0287153 | A1 * | 11/2008 | Fullam | H04H 20/67 455/502 |
| 2009/0017851 | A1 * | 1/2009 | Li et al. | 455/502 |
| 2009/0034432 | A1 * | 2/2009 | Bonta et al. | 370/255 |
| 2009/0083441 | A1 | 3/2009 | Clark et al. | |
| 2009/0147806 | A1 | 6/2009 | Brueckheimer | |
| 2009/0172201 | A1 | 7/2009 | Carmel | |
| 2009/0217074 | A1 * | 8/2009 | Nichols | G01V 1/40 713/401 |
| 2009/0228732 | A1 * | 9/2009 | Budde et al. | 713/400 |
| 2009/0248900 | A1 | 10/2009 | Marucheck et al. | |
| 2009/0274137 | A1 * | 11/2009 | Hall et al. | 370/345 |
| 2009/0290572 | A1 * | 11/2009 | Gonia et al. | 370/350 |
| 2010/0014460 | A1 * | 1/2010 | Shin et al. | 370/328 |
| 2010/0027526 | A1 * | 2/2010 | Bultan et al. | 370/350 |
| 2010/0061493 | A1 * | 3/2010 | Takahashi | H04L 7/042 375/343 |
| 2010/0097952 | A1 * | 4/2010 | McHenry et al. | 370/252 |
| 2010/0106588 | A1 | 4/2010 | Jones et al. | |
| 2010/0135334 | A1 * | 6/2010 | Briscoe | H04J 3/0664 370/503 |
| 2010/0173586 | A1 * | 7/2010 | McHenry et al. | 455/62 |
| 2010/0182980 | A1 * | 7/2010 | Jobert | H04J 3/0667 370/336 |
| 2010/0272083 | A1 | 10/2010 | Itoh et al. | |
| 2010/0303038 | A1 | 12/2010 | Krohn et al. | |
| 2010/0305740 | A1 | 12/2010 | Kent et al. | |
| 2010/0309021 | A1 * | 12/2010 | Picard | 340/870.02 |
| 2011/0092245 | A1 * | 4/2011 | Noonan et al. | 455/528 |
| 2011/0093599 | A1 | 4/2011 | Baratz | |
| 2011/0095965 | A1 | 4/2011 | Yoneoka et al. | |
| 2011/0153773 | A1 | 6/2011 | Vandwalle et al. | |
| 2011/0153818 | A1 | 6/2011 | Vandwalle et al. | |
| 2011/0154084 | A1 | 6/2011 | Vandwalle et al. | |
| 2011/0170527 | A1 * | 7/2011 | Yamamoto | H04W 56/0015 370/338 |
| 2011/0206032 | A1 * | 8/2011 | Uemura et al. | 370/350 |
| 2011/0216757 | A1 * | 9/2011 | Michel | 370/350 |
| 2011/0222515 | A1 | 9/2011 | Wang et al. | |
| 2011/0289176 | A1 | 11/2011 | Toyama | |
| 2011/0292786 | A1 * | 12/2011 | Haessler et al. | 370/216 |
| 2011/0310754 | A1 | 12/2011 | Laursen et al. | |
| 2012/0106428 | A1 * | 5/2012 | Schlicht et al. | 370/312 |
| 2012/0184311 | A1 * | 7/2012 | Yamamoto et al. | 455/502 |
| 2012/0184312 | A1 * | 7/2012 | Yamamoto | H04J 11/0053 455/502 |
| 2013/0132500 | A1 | 5/2013 | Vandwalle et al. | |
| 2013/0132501 | A1 | 5/2013 | Vandwalle et al. | |
| 2013/0185373 | A1 | 7/2013 | Vandwalle et al. | |
| 2013/0336340 | A1 * | 12/2013 | Ando | 370/503 |
| 2014/0153444 | A1 * | 6/2014 | Zhou | H04W 40/12 370/256 |

FOREIGN PATENT DOCUMENTS

| | | |
|---|---|---|
| JP | 2005-6327 A | 1/2005 |
| JP | 2010-258619 A | 11/2010 |
| JP | 2010-263349 A | 11/2010 |
| JP | 2011-244151 A | 12/2011 |
| TW | 200907719 A | 2/2009 |

OTHER PUBLICATIONS

Han et al., "Practical Considerations in the Design and Implementation of Time Synchronization Systems Using IEEE 1588", 2009.*

Wu et al., "IEEE 802.11e Enhanced Distributed Channel Access (EDCA) Throughput Analysis", 2006.*

Frattasi et al., "Heterogeneous Services and Architectures for Next-Generation Wireless Networks", 2005.*

Popovski et al., "Device Discovery in Short-Range Wireless Ad Hoc Networks", 2002.*

Haartsen, "Bluetooth: A new radio interface providing ubiquitous connectivity", 2000.*

Texas Instruments, "AN-1728 IEEE 1588 Precision Time Protocol Time Synchronization Performance", 2007-2013.*

(56) References Cited

OTHER PUBLICATIONS

Simeonidou et al., "Grid Optical Burst Switched Networks (GOBS)", 2006.*

Lee et al., "IEEE 802.15.5 WPAN Mesh Standard-Low Rate Part: Meshing the Wireless Sensor Networks", 2010.*

Li et al., "Improve TCP performance with a novel adaptive queue management scheme in IEEE 802.17 RPR optical networks", 2005.*

English language abstract of Japanese Patent Publication No. JP 2010-263349 A, published Nov. 18, 2010, retrieved from http://worldwide.espacenet.com, 2 pages.

* cited by examiner

SELECTION OF SYNCHRONIZATION STATIONS IN A PEER-TO-PEER NETWORK ENVIRONMENT

RELATED APPLICATION

This application is a continuation-in-part of U.S. patent application Ser. No. 13/625,752, entitled "Selection of a Master in a Peer-to-Peer Network Environment" [APL-P16176US1], which was filed 24 Sep. 2012 and which claims priority to U.S. Provisional Patent Application Nos. 61/561,736 (filed 18 Nov. 2011), 61/586,664 (filed 13 Jan. 2012) and 61/666,547 (filed 29 Jun. 2012).

BACKGROUND

This invention relates to the field of communications. More particularly, a system, apparatus and methods are provided for electing one or more master devices within a synchronized peer-to-peer networking environment.

Peer-to-peer network protocols or technologies allow individual nodes or devices to communicate directly with other peers, and may be contrasted with infrastructure-based environments in which a required central node (e.g., a server, a router, a switch, an access point) passes communications between different nodes. One benefit of direct peer-to-peer communication is that it avoids unnecessary additional routing and processing of communications through other devices.

However, existing peer-to-peer network technologies have limitations that diminish their usability, scalability and/or performance. For example, some technologies offer only limited peer-to-peer communication capabilities because they are focused on infrastructure-based solutions and therefore require a central node. Peer-to-peer communication in these environments requires negotiation with the central node, and may not be possible between devices that do not share a common central node. Also, communications between peers may be limited by the capabilities of the central node (e.g., frequency band, bandwidth, modulation).

Because of its prominent role, a central node may become congested and thus increase communication latency and decrease communication throughput within the environment. Further, a central node acts as a single point of failure. Even if another node can take over the functions of a failed or missing central node, until that occurs the network may be severely degraded.

Some other technologies that allow for peer-to-peer communications require significant power consumption by individual nodes, which is a principal concern for devices that rely on battery power (e.g., smart phones, tablets, laptop and notebook computers). Excessive power consumption by a peer might be caused by inefficient discovery of services and/or other devices, by having to act as a central node, by inefficient use of the device's transceiver, and/or for other reasons. For example, requiring a device to continually or regularly poll or query other devices will cause it to consume significant amounts of power, especially for a wireless device travelling through different spatial regions.

Also, some networking technologies or protocols that support peer-to-peer communications do not coexist well with other technologies. For example, in a wireless environment, typical peer-to-peer protocols are not flexible enough to share a device's radio, antenna or frequency spectrum with other protocols or between applications (e.g., to maintain a Bluetooth® connection). Some peer-to-peer technologies also do not permit multicast communications, instead requiring a device to contact multiple peers individually, and/or do not scale well as the environment becomes more densely populated.

SUMMARY

In some embodiments of the invention, a system, apparatus and method are provided for selecting one or more synchronization stations among multiple devices attempting to engage in peer-to-peer communications. In these embodiments, the selected stations broadcast a schedule of rendezvous for synchronizing the devices and logically organizing them into a hierarchy (e.g., a tree).

A single root sync (or root synchronization) station serves as the root of the hierarchy, sets the rendezvous schedule and acts as a master clock for the synchronized devices. Any number (i.e., zero or more) branch sync (or branch synchronization) stations propagate the rendezvous schedule throughout the environment, which extends the range of the hierarchy. The root sync station does not act as a central switching point of communications, and can be easily replaced by another device with minimal, if any, impact on device communications.

Every synchronization station issues periodic synchronization frames on one or more social channels. The synchronization frames identify channels and times for one or more upcoming device rendezvous. A rendezvous may be termed an "availability window."

A synchronization frame may also convey other information, such as data the devices will use to select stations as sync stations, attributes of the root sync station and/or the branch sync station that issued the synchronization frame, a timestamp and so on. All devices apply the same algorithm to identify those devices that should act as synchronization stations. In some implementations, a device applies the algorithm to first decide if it should be the root sync station, then to decide if it should be a branch sync station. If not placed into the role of a synchronization station, it will be a leaf device within the hierarchy.

DETAILED DESCRIPTION

Figure 1:
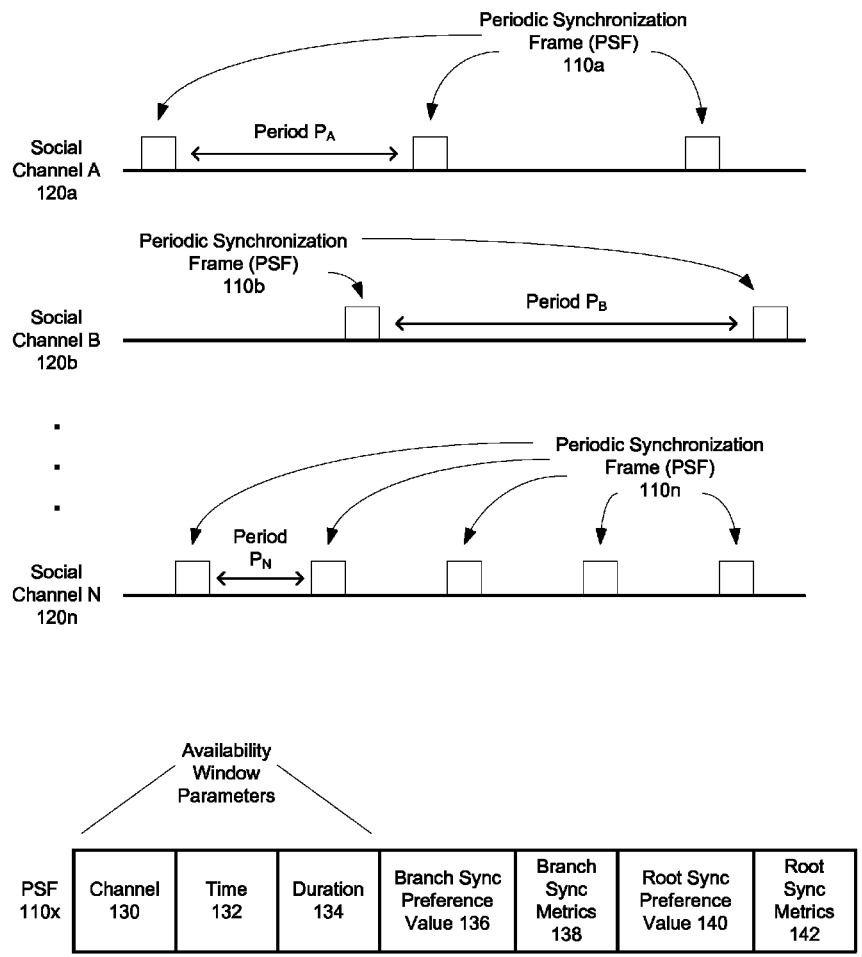
FIG. 1 depicts the use of periodic synchronization frames for achieving and maintaining synchronization among devices, according to some embodiments of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, a system, apparatus and method are provided for selecting one or more synchronization (or sync) stations among a collection of devices within a peer-to-peer communication environment. In these embodiments, the devices are organized into a logical hierarchy under a single root sync station and zero or more branch sync stations. Every other device within the hierarchy is a leaf device.

The root sync station facilitates synchronization of the hierarchy of devices by transmitting a timestamp and a schedule for rendezvousing on designated channels at designated times. Each rendezvous facilitates discovery of services and peer devices with minimal effort on the part of individual devices (e.g., no active polling is required).

Every branch sync station is synchronized with the root sync station or an intervening branch sync station, and further propagates the rendezvous schedule. Peers that are not synchronization stations may be leaf devices, and will synchronized with one of the sync stations (the root or a branch). A sync station, whether it is the root sync station or a branch sync station, may also be referred to as a master.

Introduction

A wireless communication environment may be characterized by any number of devices of the same type and/or different types—such as smart phones, tablets, personal digital assistants, laptop and desktop computers and so on. Different devices will have different features, may execute different applications, may have different power levels (e.g., battery strengths), different communication needs, different loads (e.g., on a processor, on an antenna), may be heard by other devices with varying signal strengths, etc. In addition, the communication environment may be fluid, with devices continuously entering, moving through and exiting the spatial region encompassing the environment.

Some embodiments of an invention disclosed herein provide for a protocol, mechanism and/or process for enabling devices in such an environment to discover each other and to communicate directly, peer-to-peer. These embodiments: promote low power consumption even while making devices and services readily discoverable; coexist with other communication technologies (e.g., Bluetooth®); support multi-band operation (e.g., 2.4 GHz and 5 GHz); avoid the throughput and latency degradation usually encountered with network infrastructure (e.g., access points) while maintaining compatibility with infrastructure-based technologies; easily and quickly recover if and when a device acting as a sync station exits the environment; and are scalable to accommodate dense environments having many devices. These and other features and advantages are described below.

In embodiments of the invention, devices are synchronized so that they rendezvous at predetermined times on predetermined channels. A period of time during which devices rendezvous is termed an availability window, and all sync stations broadcast or advertise the same, or similar, schedules of availability windows. During an availability window, peers may exchange multicast and/or unicast data communications, and discover other devices and services. A device may extend its attendance at an availability window to accommodate ongoing communication with a peer.

Parameters of one or more upcoming rendezvous (e.g., time and channel) are communicated via Periodic Synchronization Frames (PSF) broadcast on one or more social channels. Devices are pre-programmed to periodically listen on at least one social channel, for a length of time sufficient to hear at least one PSF. Thus, when a device boots or moves into an environment of peer devices, it will tune to a predetermined social channel and quickly learn where and when it may rendezvous with other devices. If the device does not hear a PSF, it may assume that it should act as a master and begin issuing its own PSFs to facilitate synchronization with any other devices that may be present.

Synchronization parameters (e.g., a schedule of upcoming availability windows) may also be announced during an availability window in some implementations, thereby saving the devices the expense of switching their radios to a social channel to receive the parameters. A device may even power off its radio when not listening for a PSF, participating in an availability window or using it for some other purpose. A device participating in a synchronized hierarchy may therefore share a radio, antenna and/or other communication resource with another function of the device, such as an infrastructure connection or a Bluetooth® link.

Within a community of peer devices, a selection procedure is applied to determine which will become sync stations and take on responsibility for synchronizing subordinate devices. The number of sync stations selected may depend on the number of peer devices present, their signal strengths, signal propagation patterns, configuration parameters of the environment, etc. As described below, the process of selecting or identifying sync stations may consider virtually any relevant factor of the synchronized devices.

Although devices in the communication environment engage in peer-to-peer communications without the burden of infrastructure requirements, the selection of sync stations will logically organize the devices into a hierarchy. Within the hierarchy, a root sync station (or "top master") is responsible for overall synchronization of the devices via synchronization parameters conveyed by the PSFs it broadcasts. Subordinate masters, called branch sync stations, synchronize with the root sync station (or intervening branch sync stations) and retransmit or repackage the root sync station's synchronization parameters within their own PSFs, thereby extending the range of the overall synchronization.

The radio range of a single wireless device (e.g., the root sync station) is limited, which would prevent that device from organizing devices beyond a localized region. Requiring subordinate branch sync stations to rebroadcast its synchronization parameters allows that device to synchronize a collection of devices spread over a large area. The entire community enjoys the resulting benefits (e.g., ready discovery of services and other devices, lower power consumption).

Unlike an environment that has infrastructure requirements (e.g., coordination via an access point), because a synchronization station's principal task is simply to disseminate rendezvous parameters, loss of a sync station is easily rectified. For example, the rendezvous schedule published by the missing sync station will simply be maintained while a replacement is chosen, thereby keeping all devices synchronized. And, that replacement will generally maintain the same schedule.

Different algorithms for selecting synchronization stations, or masters, may be applied at different times and/or in different environments, but generally serve to promote any or all of these objectives: even spatial distribution of masters throughout the environment, a tuneable density of masters within the environment and control of the size of the geographic area comprising the environment.

In some embodiments of the invention, the algorithm for selecting or identifying masters is executed regularly to ensure the most appropriate devices act as sync stations, based on various metrics or attributes of the devices. The selection process may also consider how many sync stations are already present in an area, how many sync stations a given peer device can hear, how far away they are (e.g., based on signal strength or some other measure of distance), etc.

Synchronization of Devices

As discussed above, synchronization of devices within a wireless communication environment according to some embodiments of the invention allows them to easily discover each other, identify available services and engage in direct peer-to-peer communications (unicast and/or multicast), all while conserving power resources and coexisting with other communication processes.

Synchronization commences as soon as a device comes online or moves within range of at least one other device operating a compatible protocol, and can be maintained as long as the device is online within the spatial area covering the synchronized devices (e.g., as long as it is in range of another device).

Through the synchronization and master selection processes, devices are automatically organized into a hierarchy, in which synchronization stations (or masters) at each level (or stratum) of the hierarchy periodically broadcast synchronization parameters in order to achieve and maintain synchronization among devices in an area. Periodic synchronization frames (PSF) are one mechanism for disseminating synchronization parameters, and are consumed by all synchronized devices.

Periodic synchronization frames serve to convey information such as, but not limited to, information for synchronizing clocks, a description of one or more upcoming availability windows during which synchronized devices can rendezvous, and metrics or attributes of the root sync station and/or the branch sync station that transmitted the PSF. In other embodiments of the invention, a PSF may include a different collection of information, but will normally include criteria identifying at least one availability window.

Formation of a hierarchy and synchronization of devices within it may be affected by configuration parameters such as, but not limited to: a maximum depth or stratum, periodicity of PSFs, number of synchronization stations (e.g., overall and/or within range of a given device), the selection algorithm used to select sync stations or masters, device metrics or attributes considered by the selection algorithm, etc. In different embodiments of the invention, different configuration parameters may be applied.

FIG. 1 depicts the use of periodic synchronization frames for achieving and maintaining synchronization among devices, according to some embodiments of the invention.

In these embodiments, periodic synchronization frames 110 (e.g., frames 110*a*, 110*b*, 110*n*) are transmitted on regular bases on one or more social channels 120 (e.g., channels 120*a*, 120*b*, 120*n*). The periodicity of these frames may be on the order of 100 milliseconds.

Different sync stations may transmit periodic synchronization frames on the same or different social channels, and any given sync station may use one or more social channels to carry its PSFs. Different social channels may be used by different sync stations in a single environment, perhaps to avoid interference with each other, because the social channel used by one station may be in use by a different station for a different purpose (e.g., an infrastructure connection), and/or for some other reason.

Although multiple social channels 120 are depicted in FIG. 1, in some implementations all master stations in one environment and hierarchy may use the same social channel. Social channels and/or other channels discussed herein may be IEEE 802.11 wireless channels.

On social channels 120*a*, 120*b*, 120*n*, respective periodic synchronization frames 110*a*, 110*b*, 110*n* are broadcast on a periodic basis by a responsible sync station. Each of the PSFs broadcast by a single sync station on a single channel (e.g., frames 110*a*) may be identical or may differ somewhat, such as in the schedule of availability windows that they convey.

Although the PSF period of each channel ($P_A$, $P_B$, $P_N$) is different in FIG. 1, in some embodiments of the invention in which multiple social channels are employed, the PSF periods of two or more channels may be identical. An illustrative period between PSFs on one channel may be on the order of 100 milliseconds. Different sync stations may thus use the same or different PSF periods. In some implementations, the length or duration of a PSF period may be inversely proportional to the number of sync stations (or the number of sync stations in a particular region) broadcasting PSFs.

In some embodiments of the invention, PSF periods will be different on each social channel; however, the availability window periods of the synchronization stations issuing the PSFs may be the same. Therefore, within one hierarchy, multiple PSF periods and a single availability window period may be in effect.

When transmitting a PSF, the issuing synchronization station merely needs to tune its radio to the correct channel and power it on long enough to send the PSF. It need not remain on that channel after issuing the PSF, but rather can switch to a different social channel (e.g., to prepare to transmit a PSF on a different channel) or may use its radio for some other purpose, such as attending an availability window (as described below), handling infrastructure communication, etc.

In different embodiments of the invention, a PSF may contain a subset or a superset of the elements of illustrative PSF 110*x*, or a completely different set of information elements. The synchronization parameters (or availability window parameters) of PSF 110*x*—the combination of channel 130, time 132 and duration 134—define one availability window during which synchronized devices can rendezvous. Channel 130 identifies the channel (e.g., an 802.11 wireless channel) on which they will rendezvous, time 132 identifies the time at which they will rendezvous, and duration 134 indicates a minimum duration of the window.

Synchronization parameters or data of a PSF may identify any number of availability windows (zero or more). Different PSFs transmitted on the same or different social channels, and by different masters, may identify the same or different availability windows. In some embodiments, however, synchronization parameters set by the root sync station (including the schedule or sequence of availability windows) are applied throughout the hierarchy.

Time element 132 of the synchronization parameters of PSF 110x may identify an absolute starting time (e.g., based on a synchronized clock, UTC (Coordinated Universal Time) or some other common reference) and/or a relative time. In some implementations, the timestamp field carries the TSF (Time Sync Function) of the station that issued PSF 110x.

In some embodiments of the invention, time 132 includes multiple values that a synchronizing device uses to compute the starting time of an availability window. In these embodiments, time 132 may include a "target" timestamp configured to indicate when PSF 110x was formed and queued for transmission within the issuing sync station (e.g., when the PSF was placed into a transmit buffer), and an "actual" timestamp configured to indicate when the PSF was actually dispatched via the station's antenna. The PSF is considered formed as of the time a "master offset" parameter is calculated by the sync station.

The master offset value, also included within PSF 110x as part of time 132 or a different information element, represents the issuing sync station's internal offset to the start of the next availability window, measured from the time it releases the PSF. In other words, the master offset measures the period of time from the target timestamp to the start of the availability window, as calculated by the station that issued the synchronization frame.

With these values, a device that synchronizes with the station that issued PSF 110x can compute an offset to the starting time of the availability window as follows:

Offset=Master offset−(actual timestamp−target timestamp)

The synchronizing device thus receives the master offset and, from the target and actual timestamps, can measure how much of that master offset time period has elapsed; it then subtracts that elapsed period from the master offset to determine the amount of time remaining until the availability window.

Duration 134 of PSF 110x indicates the minimum amount of time, during the availability window, that the sync station that issued PSF 110x will be listening and available for communication. The duration may also apply to the synchronized devices; that is, a device that attends the window may be required to be available for at least that period of time, measured from the commencement of the window.

In some embodiments of the invention, a sync station may automatically extend its availability window (e.g., in increments matching duration 134 or some other time duration) as long as at least one station is communicating with it. Thus, even if multiple stations wish to communicate with the sync station, because the window will be extended, they may be able to do so without waiting for another availability window.

Similarly, a device that attends the availability window may extend its window as long as at least one of its peers engages it in communication. Therefore, one peer that wishes to communicate with another peer may simply issue a first set of packets, datagrams, messages or other units of communication to that other peer during an availability window. Both peers will then automatically extend their windows because of the active communication. Advantageously, this allows extensive peer-to-peer communication without saturating or monopolizing bandwidth during the availability window.

A maximum duration of a sync station's presence during an availability window may be specified in PSF 110x and/or may be announced during the availability window. Illustratively, the sync station may need to depart the window in order to issue a PSF on a different channel, to use its radio for another communication function, or for some other reason. As for individual devices, they may depart an availability window after duration 134 if they have nothing to communicate and if no other device communicates with it during some period of time within the window.

Returning to FIG. 1, a preference value (alternatively termed a selection preference value or a master preference value) is a value used to identify the suitability, or preference, of a device to be a master or synchronization station. Preference values are calculated using various metrics or characteristics of the corresponding device, and possibly characteristics of the communication environment. Illustrative metrics for calculating a device's preference value include available power resources (e.g., battery strength, AC connection), processor load, signal strength and so on.

As described in the following section, preference values of synchronized devices are compared as part of a selection process to determine which devices should be synchronization stations. The process may be executed on a regular basis, such as during or after every sequence of availability windows, on a fixed schedule, etc.

In PSF 110x, branch sync preference value 136 is the master preference value of the branch sync station that broadcast PSF 110x, and represents the suitability, or preference, of that station to be a master or synchronization station. By advertising its preference value, all devices in range of that station can correctly apply the selection procedure and, for example, determine whether they are better suited to be a synchronization station.

Similarly, root sync preference value 140 is the master preference value of the root sync station for the hierarchy in which PSF 110x was broadcast, and indicates the preference of that station to be a master or synchronization station. As will be seen below, by propagating root sync preference value 140 throughout the device hierarchy, a device at the fringe of the communication environment or in an area overlapping multiple separate hierarchies can determine which hierarchy to join. In addition, all devices in the synchronized hierarchy can determine whether they are better suited to be the root sync station.

Branch sync metrics 138 include various metrics or attributes of the synchronization station that issued PSF 110x, possibly including the metrics used to calculate branch synch preference value 136. Similarly, root sync metrics 142 include metrics or attributes of the root synchronization station. Beyond the data identified above, metrics 138 and/or metrics 142 may include a station's name and/or address (e.g., MAC address), a timestamp, its level or stratum within the hierarchy, the periodicity of the station's PSFs, a social channel used by the station, etc.

In some embodiments of the invention in which metrics 138, 142 include the data used to calculate preference values 136, 140, the preference values may be omitted from a periodic synchronization frame. Further, if PSF 110x were issued by the root sync station of a hierarchy, preference values 136, 140 would match and metrics 138, 142 would also match.

In some implementations, a PSF may include information elements other than those depicted in FIG. 1. For example, a PSF may identify an algorithm for selecting sync stations or masters, specify constraints on sync stations (e.g., how many can be within range of each other), advertise a maximum depth for the device hierarchy, provide a notification that a station is departing the network, etc.

Although a sync station may have a stated period to the issuance of periodic synchronization frames, that period is flexible and there may be high tolerance for variation. A given PSF may be advanced or delayed in time because of other demands on the station's radio, because of contention on the communication channel or for some other reason. In some implementations, PSFs may vary on the order of +/−20 milliseconds every 100 milliseconds.

Periodic synchronization frames may be transmitted opportunistically, meaning that if a sync station's radio is tuned to a different channel at the time when it would ordinarily issue a PSF on a social channel, it may instead issue the PSF on its current channel. PSF broadcasts will return to their normal schedule on the social channel(s) when able.

This type of situation, in which a PSF is sent on a non-social channel to identify a future availability window, can be very useful to a localized cluster of devices. Such devices likely will be associated with the same infrastructure network on the same (non-social) channel. Transmitting a PSF on this channel saves these devices the cost of a channel switch (i.e., to the social channel) and avoids interfering with their infrastructure communications.

In the worst case, a new device tuned to a sync station's normal social channel may miss a limited number of PSFs if that sync station is busy on a different channel. However, the sync station may be tuned to a commonly used frequency (e.g., an infrastructure channel required for a particular application, as described above), and may therefore reach the same device at a different time.

Figure 2:
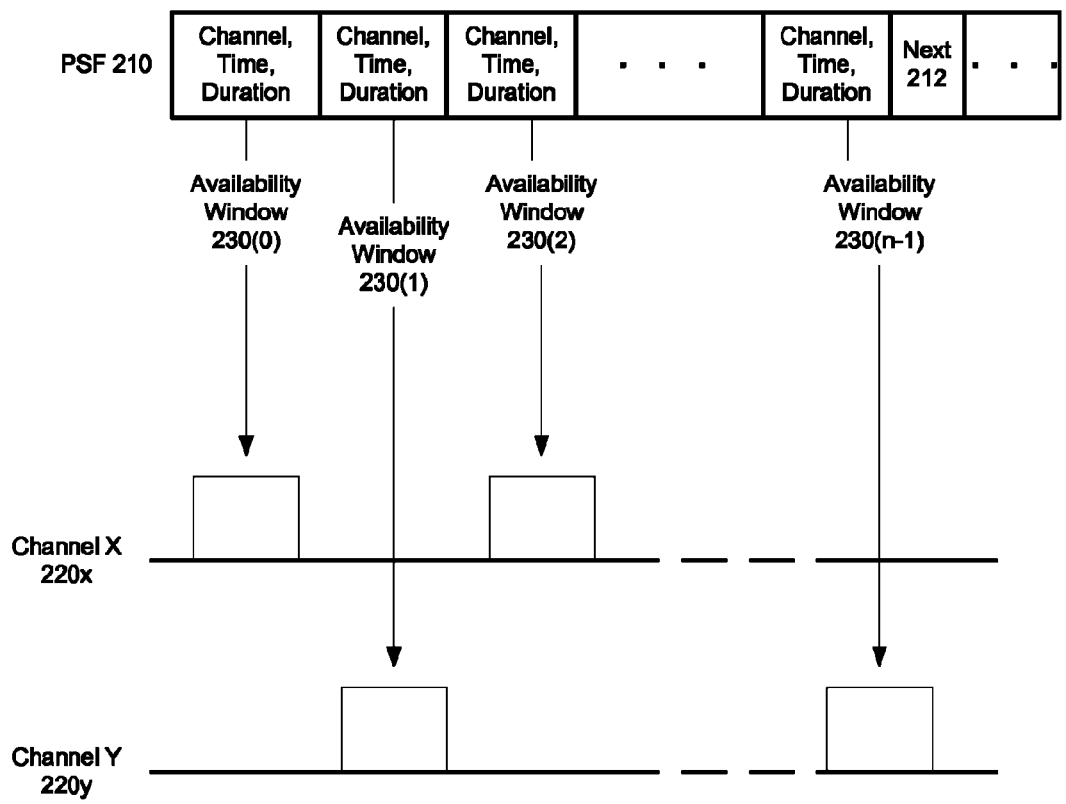
FIG. 2 is a diagram demonstrating a sequence of availability windows identified in a periodic synchronization frame, according to some embodiments of the invention.

FIG. 2 is a diagram demonstrating a sequence of availability windows identified in a periodic synchronization frame, according to some embodiments of the invention. All synchronization stations' availability windows may be scheduled for the same times, on the same or different channels, although this is not required in all embodiments of the invention.

Availability windows 230 of FIG. 2 are numbered and conducted as a repeating sequence. In particular, packet synchronization frame 210 comprises synchronization parameters that reveal a schedule of n availability windows, numbered 230(0) through 230(n−1). After one iteration, the availability window sequence numbers repeat (i.e., from 0 through n−1). A periodic synchronization frame may define any number of availability windows (i.e., zero or more).

In addition to identifying a schedule for a full or partial sequence of availability windows, a PSF may identify which availability window sequence number is next, with an information element such as element 212 of PSF 210. A periodic synchronization frame may also include other information, such as the timing information described above for helping a receiving device correctly calculate the time remaining until the next availability window.

Among other information that may be included in a PSF is the issuing station's period for sending periodic synchronization frames, and the channel or channels the PSFs will be broadcast on. This allows a peer device to determine the maximum amount of time it must listen on a particular social channel in order to hear a PSF and learn the availability window schedule. Thus, instead of identifying discrete availability windows, a PSF may report an availability window period, and individual devices can calculate when the next will occur.

Availability windows scheduled by a sync station may or may not occur at a regular period, and may or may not be synchronized with the station's PSFs. In other words, the availability windows need not occur at identical offsets from the PSFs. An illustrative duration of time that a full sequence of availability windows occupies may be on the order of five seconds, although a specific implementation of an embodiment of the invention may employ a shorter or longer duration.

In some embodiments of the invention, there is less tolerance regarding an availability window period than there is regarding a periodic synchronization frame period, perhaps on the order of +/−100 microseconds per second (compared to +/−200 milliseconds per second for PSFs). Whereas PSFs are very short (e.g., less than 1 millisecond) but issued frequently, availability windows are relatively long (e.g., longer than 50 milliseconds) and issued infrequently (e.g., approximately one per second). PSFs may be scheduled opportunistically because of their short duration, but availability windows are configured for device discovery and communication, and therefore cannot be scheduled opportunistically.

Although infrequent, availability windows may monopolize a radio interface for a significant period of time; because of this, adherence to a strict schedule is advantageous, especially if other radio technologies are present (e.g., Bluetooth). Also, other (synchronized) devices are depending upon the advertised schedule of windows for discovery and/or peer communication, which leaves less room for variation.

Therefore, in some embodiments of the invention, a PSF transmission period will have a relatively high tolerance for variation, while an availability window period has a relatively low tolerance for variation. One advantage of this strategy is that it makes allowance for Wi-Fi contention that occurs at every periodic synchronization frame transmission. PSF transmission is only possible when the selected social channel is not in use, and contention for the channel or the radio may or may not delay issuance of the PSF. Therefore, strict scheduling of all PSF transmissions would be difficult to achieve.

When a peer device first synchronizes with a master and begins attending availability windows, in the first window (and/or the first window that all devices are required to attend) it may issue a message identifying itself, identifying its preference value, providing its selection metrics, advertising its services, etc. Any devices wishing to communicate with it can then make contact.

The n availability windows advertised via PSF 210 in FIG. 2 are conducted on two different channels 220x, 220y (i.e., channel X and channel Y, respectively), which are usually not social channels, but could be. Availability windows scheduled by a sync station may alternatively occur on the same channel or may be distributed among more than two channels.

Although availability windows are provided as a primary mechanism for peer devices to discover each other and services that are offered, a device (including a sync station) may skip one or more windows in a sequence. For example, if a peer device needs to use its radio for some other purpose during an availability window, it may not attend that window at all, may arrive late or may leave early. The device may or may not advise a sync station or other devices of its absence (e.g., via a multicast message).

In some embodiments of the invention, a device may set a "presence mode" for itself, and advertise this value to its sync station and/or other peers, to indicate how frequently it will tune into or attend the advertised sequence of availability windows. In some implementations, a presence mode (or PM) is an integer value such as 1, 2, 4, etc. The reciprocal of the device's PM is a fraction indicating how many availability windows in a sequence it will attend. For example, if a device's PM=1, the device will attend every availability window; if its PM=2, the device will attend every window having a sequence number that is a multiple of 2 (i.e., ½ of the windows); if PM=4, it will attend every window whose sequence number is a multiple of 4 (i.e., ¼ of the windows).

Higher presence mode values allow a device to skip more windows and turn off its radio, thereby saving power. Ultimately, a presence mode equal to the number of availability windows in a sequence (i.e., n in FIG. 2) means that a device will attend only one availability window in the sequence. A PM value of zero may indicate that a device is always available (i.e., not just during availability windows).

In some embodiments of the invention, all synchronized devices must attend at least one availability window in the sequence advertised by its master. For example, devices may be required to synchronize during availability window 0 of each sequence. Thus, in this case, a PM value equal to the length of the availability window sequence indicates that the device will only be present during availability windows having sequence number 0.

The length of an availability window sequence is generally a power of 2 (e.g., 8, 32, 256). As shown in FIG. 2, sequence numbers of availability windows issued by a master begin at zero, and increase one at a time until reaching the value length−1 (e.g., 7, 31, 255), after which they repeat. A branch sync station is required to adopt and repeat (in its synchronization frames) the current sequence number of its master (i.e., the root sync station or another branch sync station). Therefore, all devices synchronized under one root synchronization station will agree on which availability window has sequence number 0.

In some embodiments of the invention, sequences of availability windows advertised by different synchronization stations may be of different lengths. However, all sequences will be aligned so that all devices having a particular presence mode value will attend the same windows. In other words, all devices will agree on which particular windows are multiples of a given number.

For example, consider a hierarchy in which availability window sequences of lengths 8, 16 and 64 are in use among different sets of devices. Every eighth window will be known as availability window sequence number 0 among those devices having the shortest sequence. Every availability window sequence number 0 for those devices will be known as an availability window having sequence number 0 or 8 for those devices having a sequence that is 16 windows long, or as an availability window having sequence number 0, 8, 16, 24, 32, 40, 48 or 56 for those devices with 64 availability windows in their sequence.

A device may attend more availability windows than its PM indicates, but by announcing its presence mode value (e.g., via a multicast message in availability window sequence number 0), other devices will know when they can interact with it. And, as described previously, as long as one other device sends a communication to a device having the maximum PM value (equal to the length of the availability window sequence), during a window attended by the receiving device, that device will extend its presence on that channel in order to conduct the communication.

Further, in some embodiments, whenever a peer device having a presence mode greater than one (or some other threshold) receives a communication, it may automatically set its presence mode to one (or some other lower value) in order to facilitate the desired communication. Yet further, a device with a low presence mode (e.g., zero or one), after receiving a multicast frame in one availability window, may repeat it in one or more subsequent windows to help get it to its peers.

A synchronization station may have any PM value; although it sends synchronization frames at periodic intervals (possibly even during an availability window), it may shut off its radio during an availability window when it is not sending a synchronization frame.

The format of PSF 210 of FIG. 2 is merely illustrative; in other implementations the necessary information (e.g., synchronization parameters) may be conveyed in different forms. For example, a schedule of availability windows may be disseminated as a combination of channel, time, duration and period. In this format, the channel element identifies a communication channel, the time element identifies a starting time of an availability window, the duration element indicates a normal duration of an availability window, and the period element reports the period with which availability windows will be repeated, In some embodiments of the invention, two or more peer devices wishing to conduct a relatively extended period of communication (e.g., for file transfer, to engage in a game or other application) may establish their own synchronization for the purpose of exchanging data, parallel to the overall synchronization, but outside of or in addition to scheduled availability windows. In these embodiments, one of the two or more devices may assume the role of a non-selection master, meaning that it does not participate in a master selection process as described in a following section, but is available for other devices to synchronize to (e.g., to conduct a file transfer, to play a game). Devices synchronized with a non-selection master may form a basic service set (BSS).

A non-selection master may issue synchronization frames that the other peer devices with which it will communicate will use to synchronize with the non-selection master, but which other devices in the community will ignore. Illustratively, these synchronization frames may be transmitted during an availability window or on an agreed-upon channel. A non-selection master's synchronization frames may specify that the device is a non-selection master, so that devices not needing to directly communicate with it will know that they should not synchronize with it.

A device that wants to synchronize or maintain synchronization with a community of peers may be unable to do so, perhaps because it cannot monitor the community's social channel(s), has other commitments during the scheduled availability windows, or for some other reason. In this situation, the device may become a non-selection master (and identify when it is available) to help other devices discover it. Alternatively, it may request a sync station to alter its synchronization schedule to accommodate the device (e.g., change the channel(s) and/or times of the sync station's availability windows), or may become a sync station if its selection preference value indicates that it should. As a sync station, especially as root sync station, it could change the availability window schedule.

In some embodiments of the invention, during an availability window on a rendezvous channel a synchronization station or other device (e.g., a non-selection master) may broadcast a different type of synchronization frame called a master indication frame (MIF). In these embodiments, master indication frames provide information that help peer devices achieve or maintain synchronization—either with a sync station that issues regular PSFs or with a non-selection master that devices may synchronize with to exchange data directly. A master indication frame may be sent during an availability window, but generally will not be sent on a social channel unless, for example, one is sent during an availability window that is occurring on a social channel.

A master indication frame may include any data that a periodic synchronization frame might include, and/or other information. For example, an MIF might be sent by a sync station to report that it will start using a different social channel for sending PSFs, might be sent by a non-selection master to report that it will have a window of availability on a particular channel at a particular time, might be sent by another device to report synchronization data it heard from some other sync station or to advertise its availability, etc.

When an availability window overlaps with the time a PSF would normally be sent (i.e., according to the issuing sync station's PSF period), the regular PSF may be sent on the channel on which the availability window is conducted (and not on the social channel). During availability windows that do not overlap with the expiration of a master's PSF period, the master may nonetheless send an MIF to ensure that devices synchronized with it have the necessary synchronization data without having to tune into a social channel for a regular PSF. However, a device may still periodically listen on one or more social channels to learn of other masters.

Because peer devices having presence mode values other than one may not attend every availability window, but may be required to be present during availability windows having sequence number 0, a sync station may by default always broadcast a PSF or MIF during those windows. Whereas PSFs are short but frequent, MIFs are longer and less frequent, and may pack extended service and device capability payloads.

It may be noted that periodic synchronization frames are sent frequently, usually outside of availability windows, in order to help non-synchronized devices synchronize with their peers. After a collection of devices is synchronized, those devices may only (or primarily) meet during relatively sparse availability windows, especially those devices that have adjusted their presence modes to use their radios less and thereby save power. To remain synchronized, these devices may rely on master indication frames sent during availability windows.

In some embodiments of the invention, devices are required to implement guard periods at the beginning of some (or all) availability windows, during which they listen and can receive communications, but do not transmit. In different embodiments of the invention, this restriction may or may not always apply to sync stations that issue regular PSFs, but generally will always apply to non-selection masters.

Figure 3:
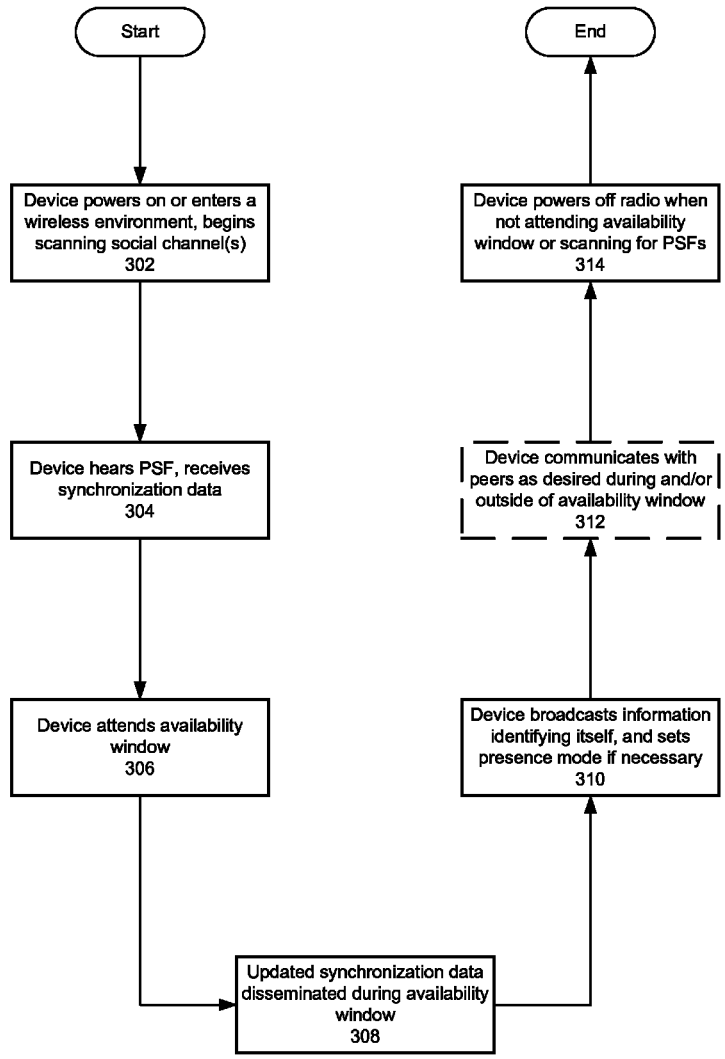
FIG. 3 is a flow chart demonstrating synchronization of a device with a community of peers in a wireless communication environment, according to some embodiments of the invention.

FIG. 3 is a flowchart demonstrating synchronization of a device with a community of peers in a wireless communication environment, according to some embodiments of the invention.

In operation 302, the device powers on or enters the environment and begins listening on one or more predetermined social channels for a periodic synchronization frame (PSF). It may be programmed with information regarding the default or possible periodicity of PSFs, and may therefore only need to listen on a given social channel for a limited number of those periods (e.g., one, two) in order to intercept a PSF broadcast by a sync station on that channel.

In operation 304, the device hears one or more PSFs and extracts their synchronization data. In the illustrated embodiment of the invention, all PSFs issued by synchronization stations within the same device hierarchy will advertise the same availability window sequence or schedule. The sync stations may transmit their PSFs on the same or different social channels, and may conduct the availability windows on the same non-social channels.

If the device did not hear any packet synchronization frame, it may assume that there is no sync station within range. Therefore, it may take on the role of root sync station and begin issuing its own PSFs in order to synchronize other devices in range. As described in a following section, a process for selecting synchronization stations may be regularly or even continually applied to identify the devices that should be masters.

In operation 306, the device tunes its radio to the specified channel and attends the next availability window, assuming that its radio is not preempted by another application or service. If it cannot attend, the device will attend the next availability window that it can, although it may need to listen on a social channel again to receive the next set of synchronization data and learn its channel and starting time. The device may postpone attending an availability window until the start of the next sequence of windows, and therefore tune into the next required window (e.g., a window having sequence number 0).

In operation 308, during an availability window, a synchronization frame is broadcast by the sync station with which the device is now synchronized (e.g., a PSF or an MIF). This may relieve the device of the need to scan one or more social channels. The synchronization frame illustratively may be transmitted during an initial guard period or quiet period at the beginning of the availability window, during which some devices (e.g., devices that are not sync stations) may not transmit.

In operation 310, the device sets its presence mode if necessary or desired (e.g., if the device cannot attend the full sequence of availability windows). During at least the first availability window that it attends, and/or the first availability window having sequence number 0, the device identifies itself (e.g., address, name) in a message broadcast to all synchronized devices. It may advertise its presence mode at the same time.

In optional operation 312, the device may communicate directly with one or more of its synchronized peers during the availability window and/or out-of-band, or they may communicate with the device. As discussed above, the device may extend its attendance at the window one or more times in order to facilitate the communications, will advertise to its active peers if and when it must leave the window (e.g., to use its radio for some other purpose), and may arrange a separate rendezvous off-channel with another peer.

In some embodiments of the invention, traffic reduction or limitation measures may be implemented during some or all availability windows in order to reduce communication congestion and collisions. Illustratively, the sync station that controls the availability window sequence may specify when a measure is in place. In some implementations, traffic reduction measures are only applied during availability windows, and not during availability window extensions. In mandatory availability windows (i.e., availability windows having sequence number 0), traffic reduction measures may be mandatory.

By way of example, a traffic reduction measure may serve to limit a device regarding the number of multicast frames it may transmit during one availability window (e.g., approximately three). Transmission of unicast frames may also be limited.

For example, unicast transmissions may only be permitted to (and/or from) devices having unknown presence mode values or values greater than one (or some other threshold). Limitations on unicast or multicast frame transmission may not apply to devices synchronizing among themselves (e.g., with a non-selection master) for a limited purpose, such as file transfer.

In operation 314, the device may power off its radio when not needed to listen for PSFs on a social channel or to attend an availability window.

The method of the invention depicted in FIG. 3 is merely illustrative, and does not limit methods according to other embodiments of the invention.

As described above, two or more peers may engage in their own synchronization, outside of or in addition to any availability window. For example, one of them may assume the role of a non-selection master and issue master indication frames or other synchronization frames during an availability window, to advise its peers as to when and where (i.e., time and channel) they may synchronize with it.

However, one peer may desire a short communication exchange with another peer without synchronizing. For example, a device synchronized with one hierarchy may wish to discover services offered by a peer (or peers) synchronized within a different (e.g., neighboring) hierarchy, may wish to poll a neighboring peer, etc. At least initially, they do not intend to engage in a significant exchange of data (e.g., as with a file transfer). Some embodiments of the invention provide this ability in the form of out-of-band inquiries and responses.

More specifically, a first peer may hear a synchronization frame of a neighboring hierarchy and thereby learn its schedule of availability windows. If able, it may attend one or more of the neighboring hierarchy's availability windows and thereby discover other devices. It may then send an out-of-band frame to one or more of the neighboring devices.

Figure 4:
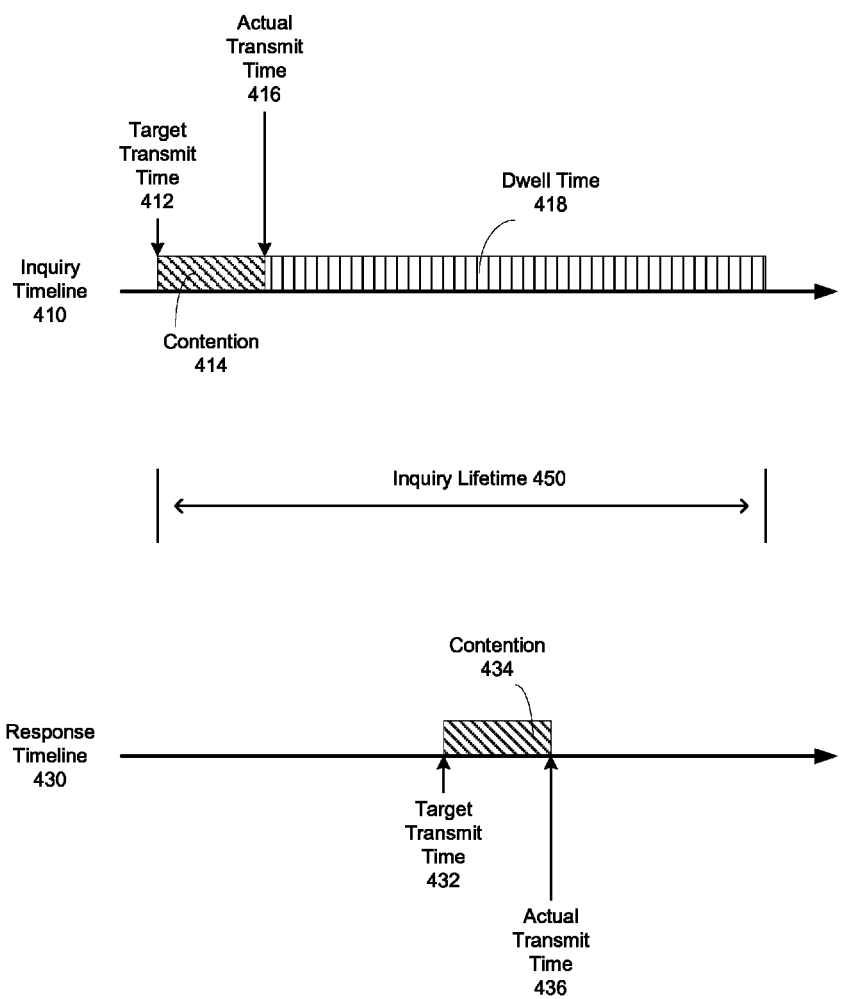
FIG. 4 is a diagram demonstrating an out-of-band exchange according to some embodiments of the invention.

FIG. 4 is a diagram demonstrating an out-of-band exchange according to some embodiments of the invention. As with the timing of periodic synchronization frames described above, the transmitting device must consider delay that will occur within itself, between the time it releases or prepares the inquiry for transmission and the time it is actually transmitted.

Inquiry timeline 410 reflects activity at the inquiring device, while response timeline 430 reflects activity at the responding device. When issuing the inquiry, the inquiring device must choose a suitable inquiry lifetime 450, such that the responding device will have time to receive, process and react to the inquiry.

In the illustrative inquiry and response, the inquiry is queued for transmission from the device at target transmission time 412. Because of contention for the antenna or the medium, and/or other delay (collectively represented as contention 414 in FIG. 4), the inquiry is not physically transmitted until actual transmit time 416.

Dwell time 418 is the remainder of the inquiry lifetime, during which the responding device must receive the inquiry and generate and transmit its response. The duration of dwell time 418 depends on the inquiry lifetime set by the inquiring device and the duration of contention 414. The responding device may also experience delay between its target transmit time 432 and the actual transmit time 436 of the response; this delay is represented as contention 434.

The inquiry may identify (in the out-of-band inquiry) any or all of the relevant time parameters (e.g., inquiry lifetime, target transmit time, actual transmit time, contention), so that the responding device can determine whether it will be able to respond before the inquiry expires. If not, it may drop the inquiry or abort its response. If the inquiring device does not receive a response during the inquiry lifetime, it may retry (e.g., with a longer lifetime), abandon the inquiry or take other action.

In some embodiments of the invention, a peer device may issue out-of-band inquiries to a sync station that it can hear, but which it is not synchronized to, in order to identify services offered by that station and devices synchronized to that station. In some implementations, it may relay information regarding other sync stations to its synchronized peers, such as during one or more of their availability windows. Information about another sync station (or other peer device) that may be revealed may include things such as a social channel it monitors, its availability windows (e.g., time, channel), master offset, services it offers, address, etc. An out-of-band inquiry may thus function as a quasi-PSF or quasi-MIF, in that it can allow a device to synchronize to the hierarchy of the sender of the inquiry.

Some unsynchronized masters (e.g., synchronization stations to which no leaf devices or subordinate sync masters have synchronized) may adopt a low-power mode of operation. This low-power mode of operation may be indicated in the station's PSFs, or may be inferred by the sequence or schedule of availability windows and/or the presence mode advertised in the PSFs.

In one such mode of operation, an unsynchronized master may still send periodic synchronization frames, but provide short availability windows having long periods (e.g., multiple seconds). Because of the short, sparse nature of the availability windows, it may take some time for a peer to discover services offered by the unsynchronized master.

During synchronization of peers within a communication environment according to some embodiments of the invention, as peer devices are organized into a hierarchy, leaf (or slave) devices synchronize with branch sync stations within range; those stations (and possibly other leaf devices) synchronize with higher branch sync stations, and so on, with one root sync station providing synchronization information for the entire environment.

A configuration parameter of the environment may specify the maximum depth of the hierarchy, which may be defined as the number of levels or strata of sync stations. The root sync station's position is defined as stratum zero, and branch sync stations will reside in strata numbered 1 through D, wherein D is the maximum stratum at which a synchronization station may reside.

By default, while the hierarchy is being organized, a peer device may issue periodic synchronization frames until it falls into position as a leaf, at which time it stops transmitting PSFs. A device may choose to be a leaf, even if the applicable selection algorithm could otherwise make it a sync station.

All sync stations continue to issue PSFs to maintain synchronization within their areas, and may do so with a periodicity that is a function of its level, or stratum, within the hierarchy. For example, the root sync station at stratum 0 may issue PSFs on the order of every 100 milliseconds (ms), a branch sync station at stratum 1 may issue PSFs on the order of every 150 ms, a branch sync station at stratum 2 may issue PSFs every 500 ms, and so on. These values are merely exemplary and in no way limit or restrict the duration of PSF periods; synchronization stations within different strata may employ the same period, and synchronization stations in the same stratum may employ different periods.

A sync station's stratum will usually be reported within its PSFs. This information allows a listening device to determine how deep the hierarchy is within its area of the environment. Depending on that depth and/or other information (e.g., how many sync stations it can hear issuing PSFs, the maximum hierarchy depth), the device may be able to determine that it should be a leaf or that it should continue issuing PSFs and remain a sync station.

A hierarchy's maximum depth parameter may be programmed into devices and/or advertised within periodic synchronization frames. Other restrictions may also be imposed, such as a maximum number of sync stations, a requirement that a sync station only continues in its role as long as it can hear no more than a threshold number of sync stations (e.g., within a particular range, at a particular stratum, overall), etc.

For example, where the hierarchy's maximum depth is D, a sync station situated at stratum S≥1 (i.e., all strata except the root) may only be allowed to hear D−S other sync stations operating in stratum S and still continue to serve as a sync station (assuming those other sync stations have higher or better selection preference values). This provision may allow for concentration of higher level branch sync stations near the root sync station, and dispersion of branch sync stations further away.

In some embodiments of the invention, a selection algorithm or process may prefer to retain an incumbent sync station over another device that would otherwise be given preference, unless the other device's selection preference value exceeds the incumbent's by a threshold. This may help avoid thrashing or excessive switching of sync stations. However, because a sync station's principal task is simply to broadcast synchronization data, switching sync stations does not impose a high transaction cost on the hierarchy.

In some embodiments of the invention, a device will synchronize with the best sync station that it can hear (i.e., the sync station having the highest preference value), or the best sync station that it can hear within a given range (e.g., with a signal strength above a particular threshold), as long as that best sync station is not at the maximum depth of the hierarchy.

When a device comes online in an environment and listens for PSFs, if it only hears from a branch sync station at the deepest or maximum stratum of the hierarchy, it may synchronize to that sync station as a leaf. If, however, the device can also hear another sync station in a different hierarchy (e.g., as determined by the root sync station attributes advertised in a periodic synchronization frame), it may favor joining that hierarchy if that other sync station is not at the maximum depth or stratum or if that other sync station has a better selection preference value.

A device that can only hear other devices relatively deep in the hierarchy (e.g., high strata values), may be able to determine that it is at the fringe of the environment. If most or all of the other devices are already at the maximum depth, a new hierarchy may spawn, especially if a device with a high selection preference value appears.

A new environment/hierarchy may also spawn when an existing one spans too large a spatial area. For example, a combination of the depth of the hierarchy, a measure of how close peer devices are and/or other factors, may cause a new hierarchy to be spawned. As discussed in the following section, signal strengths detected between peers may be one way of determining how close the peers are.

Requiring peers to synchronize only with masters relatively close to them may cause the hierarchy to be relatively compact. In contrast, a high limit on the maximum depth of the tree may allow the hierarchy to cover more area. By adjusting these (and/or other parameters), a suitable hierarchy may be formed.

Different parameters for configuring a hierarchy will be suited to different environments, depending on the density of devices, the communication load and/or other factors. For example, if the load is relatively light (e.g., the devices are low-power sensors), drawbacks associated with a hidden node problem should be limited and a relatively deep hierarchy may be implemented (e.g., on the order of ten to fifteen levels). Also, in sparser environments, a process for selecting sync stations described below will resolve more rapidly.

The hidden node problem refers to a scenario in which multiple devices that are not in range of each other try to communicate with a common peer. Because they cannot hear each other's transmissions they cannot avoid them, and their communications to the common peer may collide. Although this may be exacerbated by the need to communicate during a relatively short period of time (i.e., within an availability window), the light load may help mitigate the problem and allow a deeper hierarchy than would be possible in a dense environment with a heavier load.

Without the method of synchronization described herein, the total number of discovery frames needed to discover all devices in an environment could approach the square of the number of devices (i.e., each device might need to send at least one frame to every other device). These frames would be sent at random times and on any channels.

In contrast, the collective synchronization afforded by embodiments of the present invention enables synchronization based on regular transmissions from a select set of devices (i.e., sync stations), and scales well. In a perfectly synchronized environment, the number of frames needed for all devices to discover each other is proportional to the number of devices. One discovery frame broadcast during an availability window having sequence number 0 will reach all other devices in range.

Selection of Synchronization Stations

In different embodiments of the invention, different algorithms may be applied to determine which peer devices should be synchronization stations (also known as masters). The algorithm that is applied within a given environment usually will be symmetrical, meaning that every device uses the same data regarding itself and its peers, and so every device will come to the same conclusion regarding which device should be the root sync station and which other devices should be branch sync stations. In some embodiments, the specified selection algorithm is executed during or after each availability window (and any extensions to that window), or after some configurable number of availability windows.

As described in the preceding section, one device parameter that may play an important role in selecting sync stations is the master preference value, which indicates the preference for that device to be a master, or sync station.

Each device's preference value is derived in the same way, using the same metrics (the "selection metrics") or attributes of the device. Illustrative selection metrics include available power (e.g., battery strength), whether the device is connected to an AC power source, the type of device, device configuration (e.g., features, resources), whether (and how many) applications or utilities require use of the device's radio, whether the device has multiple antennas and transceivers, whether the device can operate on multiple bands (e.g., 2.4 GHz and 5 GHz), processor load, transmission contention, presence mode and so on.

In a simple implementation, a device's preference value may be an integer value that is proportional to its remaining battery power. A tie among multiple devices' preference values may be resolved by comparing network (e.g., MAC) addresses, IMSI (International Mobile Subscriber Identity), IMEI (International Mobile Equipment Identity) or some other unique characteristic of the devices.

In some implementations, devices may communicate just their preference values to each other, but may also or instead communicate the selection metrics used to calculate the preference values. As discussed previously, the preference value and/or selection metrics of the hierarchy's root sync station may be included in all periodic synchronization frames, a branch sync station's data may be included in the PSFs that it issues, and leaf devices' data may be announced during availability windows.

In some embodiments of the invention, the peer device having the highest preference value becomes the root synchronization station of the environment's hierarchy. One or more branch sync stations may also be selected to expand the area of synchronization, and other peers will be leaf devices (or slaves). Every device, except the root sync station, synchronizes to either the root sync station or one of the branch sync stations.

In some embodiments of the invention, besides being deployed at specific strata within the hierarchy, other peer devices may be categorized relative to a given device by how physically close they are to that device. For example, in one implementation, a given device may categorize peer devices that it can hear into one of three ranges: "close range," "mid-range" or "far range."

Range measurements or estimates may be derived from signal strength indicators (SSI) and/or other indications of distance (e.g., GPS data). By way of illustration and not limitation, "close range" may be defined as approximately 5 meters, "mid-range" may be defined as approximately 10 meters, and "far range" may be defined as approximately 15 meters or further.

Other ranges (more or fewer than three) may be used in other implementations. For example, a device may consider just one range, which may correspond to one of the close range, mid-range or far range estimates above, or some other range or signal strength. To avoid boundary conditions, a peer device may need to be heard with at least a threshold RSSI (Received Signal Strength Indication) in order to be considered in the selection process.

A selection process may operate on a regular basis, such as after (or during) every availability window, after every complete sequence of availability windows or on some other schedule. A new device entering a synchronized communication environment may usurp an existing synchronization station, a device that is a leaf or a lower branch sync station in the hierarchy may move up (e.g., because other devices having better preference values have departed), other devices may move down from being a branch sync station to being a leaf device, etc.

After a device takes position as a leaf or sync station within a hierarchy, it will continue to listen to synchronization frames to determine if it is better suited to be a sync station (or a higher sync station) than the stations sending those frames. For example, it may continually collect and process devices' preference values or selection metrics to determine whether other devices are better suited to be sync stations than the device itself.

As a device hears synchronization frames from different peers, it may assemble a list of sync stations that it hears and/or that are identified in the frames. This allows the device to periodically determine whether it should serve as a sync station and start issuing synchronization frames. Such a determination may depend on its preference value (or selection metrics) versus those of the other devices, how many sync stations it hears, how far away those stations are, and/or other factors.

The following sub-sections describe some illustrative methods of selecting synchronization stations according to some embodiments of the invention. These methods are not limiting, and other suitable methods may be derived from the preceding and following discussions without exceeding the scope of this disclosure.

A First Illustrative Process for Selecting Synchronization Stations

In some embodiments of the invention, devices first synchronize with the best close-range sync station—the sync station, within a distance defined as "close," that has the best master preference value. Then each close-range sync station will attempt to synchronize with the best mid-range sync station (if one exists). Later, they will attempt to synchronize with the best far-range sync station. In other embodiments, only two ranges are used; devices first synchronize with the best close-range sync station, and then those sync stations synchronize with the best far-range sync station.

Figure 5A:
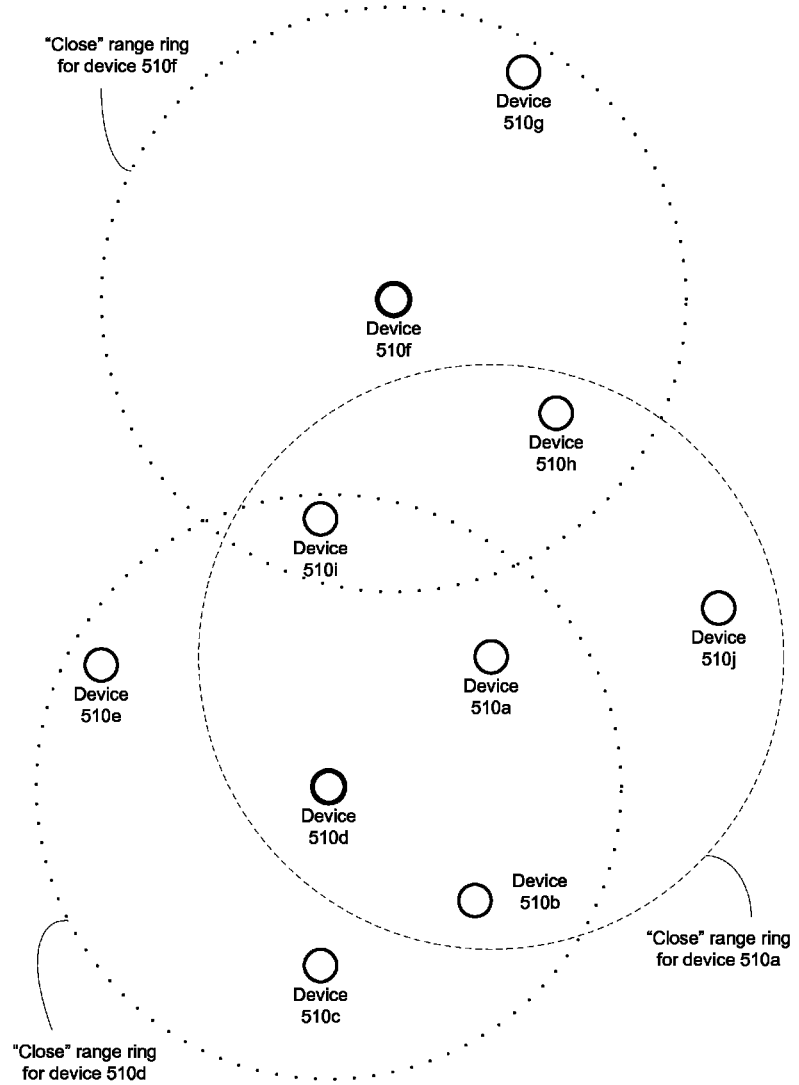
FIGS. 5A-D depict the selection of synchronization stations within a collection of peer communication devices, according to some embodiments of the invention.

FIG. 5A depicts a collection of peer communication devices that may synchronize and select master stations, according to some embodiments of the invention. In the illustrated scenario, peer devices 510 come online or enter their environment simultaneously or nearly simultaneously, thereby requiring all devices to determine suitable positions for themselves in the hierarchy at approximately the same time.

When devices 510$a$-510$j$ come online, they will listen on at least one designated social channel. This channel may be programmed in the device's firmware, may be programmed by a service provider as part of the provisioning process, or may become known to the devices in some other way.

They each listen for the duration of time equal to or greater than one known or default PSF period (e.g., 100 ms), during which a branch sync station or the root sync station would normally broadcast one periodic synchronization frame (if present). Because no other devices were present in the illustrated environment prior to the appearance of devices 510, they do not hear a PSF. In some implementations, a device may listen on multiple different social channels and/or may listen for a longer time (e.g., multiple PSF periods) before assuming that no sync station is present.

Because no master station is detected, they all decide at approximately the same time that they should act as sync stations, and therefore they all commence issuing PSFs at approximately the same time. As described in the preceding section, the PSFs advertise a sequence of one or more availability windows, specify which stratum they are operating at (in this case, stratum zero or the root), and also provide the issuer's preference value and/or selection metrics.

For purposes of describing an embodiment of the invention, in FIG. 5A device 510$f$ has the best preference value, followed by device 510$d$. The maximum depth of a hierarchy is two, meaning that there will be only two levels or strata of masters—the root sync station (at stratum 0) and one level of branch sync stations below it (at stratum 1). All other peers will be leaf devices synchronized to one of the sync stations.

Because they all issue PSFs, all the devices will detect at least one peer's periodic synchronization frames. Despite collisions, interference and retransmissions, each device will become aware that there are peers acting or attempting to act as sync stations.

Each device will either continue to issue PSFs or will stop, depending on its preference value, other peers' preference values gleaned from the PSFs it hears and/or other factors. Because all devices broadcasting synchronization frames report their preference values (or their selection metrics), the devices can easily be compared to determine which should be sync stations.

In the embodiment of FIG. 5A, a device may be programmed to automatically cease issuing PSFs if it hears a threshold number of sync stations (e.g., overall, within a particular stratum, within a particular range), especially if these other devices' have better or higher preference values. In particular, all the devices assumed they were the first master, and so their PSFs will indicate that they are at stratum 0 (i.e., the root). Because the threshold of sync stations at that level is configured to be one (i.e., there can be only one root synchronization station), as soon as a device hears one PSF from a peer operating at stratum 0 that has a better preference value, the device should stop issuing PSFs.

However, as described above, in some embodiments of the invention devices first synchronize with sync stations close to them, before the devices look further out. Therefore, they may at first only compare themselves (their selection metrics or preference values) with devices they detect (e.g., based on RSSI) as being within close range (e.g., five meters).

A master selection algorithm or process may provide for a maximum number of sync stations within each of multiple ranges. A device competing to be the root sync station within a first range (e.g., "close" range) will cease competing (and stop broadcasting synchronization frames) when it recognizes a number of better qualified devices within that range that meets or exceeds the maximum number of sync stations for that range (i.e., one). Similarly, a device competing to be the root sync station within a second range (e.g., "far" range) will cease when it recognizes a number of better qualified devices within that range that meets or exceeds the maximum number of sync stations for that range (i.e., also one).

By synchronizing first with a "close" master, the environment tends to aggregate into local clusters, at least initially. This can help reduce interference, and also reflects realistic situations, in which a user of a device is often sharing data with another user close to him or her, rather than someone further away. By subsequently looking further outward, clusters of devices can discover and synchronize with the larger environment.

In the environment depicted in FIG. 5A, two ranges are considered—"close" and "far." As discussed previously, categorization of a device as being close or far may depend on the strength of a signal between the two devices and/or other factors. In other embodiments, other ranges may be considered.

In FIG. 5A, "close" range rings are illustrated for the two devices with the best master preference values (devices 510*f*, 510*d*). The close-range ring is also shown for an illustrative device that will not become a sync station—device 510*a*.

To continue the narrative from above, because every device understands that there can be only one root sync station (at stratum 0), they all cease issuing PSFs if there is a device with a higher preference value within close range. This means that within their respective close ranges, only devices 510*f* and 510*d* continue issuing periodic synchronization frames; each thus becomes the root sync station within their close ranges. Therefore, in this illustrative scenario, at least two separate peer hierarchies temporarily exist—one rooted at device 510*f* and one rooted at device 510*d*. As will be seen shortly, they will merge.

The other devices within range of these two stations synchronize to them and may begin attending their availability windows. Note that device 510*i*, which is within close range of both of the root sync stations, synchronizes to device 510*f* because it advertises a better master preference value than device 510*d*.

Now that each device recognizes its root synchronization station, each device that is not a level 0 sync station may determine whether it should bid to be a branch sync station at stratum 1. This determination may depend upon factors such as maximum depth of the hierarchy, how many other master candidates it hears at that level (if any), how close it is to those other candidates, devices' preference values, etc.

In embodiments of the invention reflected in FIGS. 5A-D, a configuration parameter for the environment may dictate that, at a given stratum or level, a device will assume that another sync station is needed (and that it is a candidate for that position) unless it can hear some threshold of other sync stations at that stratum that have better preference values.

In the example depicted in FIGS. 5A-D, at stratum 1 and with the maximum depth of a hierarchy being 2 (e.g., two layers of sync stations, at strata 0 and 1), perhaps a device can only bid to become a stratum 1 branch synchronization station if it doesn't hear any other sync station at that stratum (or any other sync station within a particular range). In other words, there can be only one branch sync station at stratum 1 within range of any other device. Any device that hears PSFs from a stratum 1 sync station will refrain from transmitting its own PSFs and bidding to become a master station, as long as that stratum 1 branch sync station has a higher master preference value.

Therefore, in FIG. 5A, some devices other than devices 510*f* and 510*d* will issue PSFs advertising the same availability windows as their root sync stations (510*f*, 510*d*), but reporting their own stratum (i.e., 1) and their preference values. Devices that hear these peers' PSFs will halt their own bids to become level 1 branch sync stations if their preference values are worse, but will continue if they are better.

Therefore, at least one of devices 510*g*, 510*h*, 510*i* will become stratum 1 branch sync stations under root sync station 510*f*. Similarly, at least one of devices 510*a*, 510*b*, 510*c*, 510*e* will become stratum 1 branch sync stations under device 510*d*. Because they are currently only selecting close-range sync stations, and because of the distances between the peers, more than one stratum 1 branch sync station will actually be selected in the separate hierarchies.

Other devices that are in close range to the root sync stations but have insufficient master preference will be leaf devices and will remain synchronized with a sync station. The stratum 1 branch sync stations will extend the range of the hierarchy and help bring more devices into synchronization.

For example, device 510*j*, which is beyond close range for both device 510*f* and device 510*d*, may have established its own single node hierarchy. It will be recalled that all devices 510 came online simultaneously and started issuing PSFs nominating themselves as root sync station. Assuming that device 510*j* has a higher master preference value than any devices close to it (e.g., devices 510*a*, 510*h*), it would continue acting as a synchronization station even after they defer to other devices and cease issuing PSFs. Assuming further that the preference value of device 510*j* is lower than those of devices 510*d* and 510*f*, the close devices (e.g., devices 510*a*, 510*h*) will synchronize with devices 510*d* and 510*f* rather than with device 510*j*. Thus, device 510*j* temporarily forms its own environment and hierarchy.

Now, if either or both of devices 510*a*, 510*h* become a stratum 1 branch sync station, they will start issuing PSFs that advertise the preference values of their root sync stations. Device 510*j* will hear those PSFs and realize that a hierarchy rooted at a "better" root sync station is within range, and will therefore synchronize with the device advertising the best root sync station (i.e., device 510*h* if it can hear both 510*h* and 510*a*).

This scenario demonstrates that a device (e.g., device 510*j*) may synchronize with, and become a leaf under, a peer having a lower master preference value (e.g., device 510*h*) if the device cannot directly hear the peer's sync station or if that sync station is beyond the range at which the device is currently listening. If the leaf device were configured to look further out (e.g., to a "far" range), it may synchronize directly to that far-range sync station, or to a different device altogether. Alternatively, while acting as the root sync station of its own one-node hierarchy, device 510*j* may start listening for a better far-range sync station and synchronize with device 510*f* directly.

In some embodiments of the invention, in addition to considering how many sync stations a device can currently hear, the ranges of those sync stations may also be considered when the device determines whether it should cease attempting to be a sync station. For example, and as discussed above, a peer device may stop issuing periodic synchronization frames and defer to close-range peers having better preference values if it hears a first threshold number of such peers (e.g., one). In these embodiments, a peer device may also stop issuing PSFs, even if no better close-range sync station is heard, if it hears a second threshold of far-range peer devices having better preference values (e.g., three).

Figure 5B:
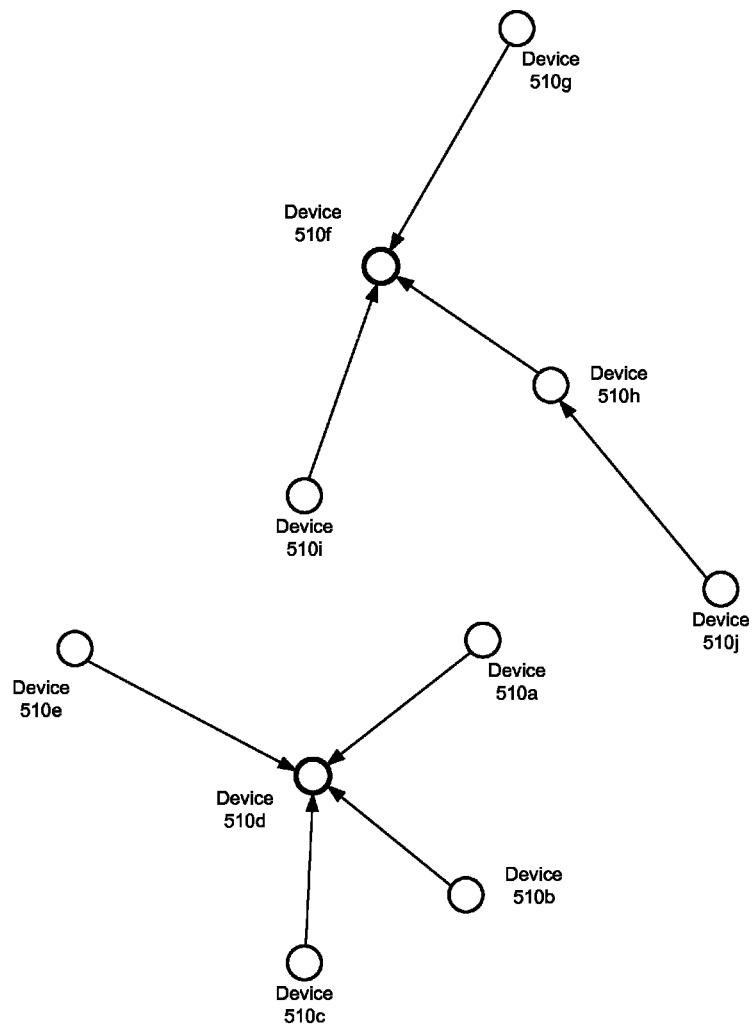

FIG. 5B is a diagram of the hierarchies that may result from the close-range synchronization and selection of sync stations shown in FIG. 5A, according to some embodiments of the invention. Line segments represent synchronization, with arrowheads pointing to the synchronization station that is issuing PSFs and managing availability windows.

Although multiple devices may be acting as stratum 1 branch sync stations and sending PSFs, in FIG. 5B only one of them (device 510*h*) has actually extended its hierarchy beyond the range of its root sync station. The synchronization and organization of devices depicted in FIG. 5B may be settled on the order of one second or one availability window from the time all devices came online. The duration of time required for all peers to settle into appropriate roles and strata will differ from implementation to implementation, depending on the number of devices, the frequency and duration of the availability windows during which the master selection algorithm is executed, and/or other factors.

In some embodiments of the invention, a synchronization tree or hierarchy such as that shown in FIG. 5B is not intended to be used for routing purposes, but rather to synchronize devices within an area so that they may communicate directly, in peer-to-peer fashion.

After synchronization at close range, in the illustrated embodiment of the invention root sync stations (i.e., those at level 0—devices 510*f*, 510*d*) now look further out, to determine whether they should synchronize to a different sync station. For purposes of illustration, it may be assumed that "far" range is approximately twice the distance of close range.

In some other embodiments, all sync stations listen for devices at longer range; leaf devices remain focused on close range. If they have insufficient preference values to become sync stations within a close range, there is little reason to have them to expend the effort to determine whether they should be a longer-range sync station. In yet other embodiments, all devices may listen for devices at longer range.

Figure 5C:
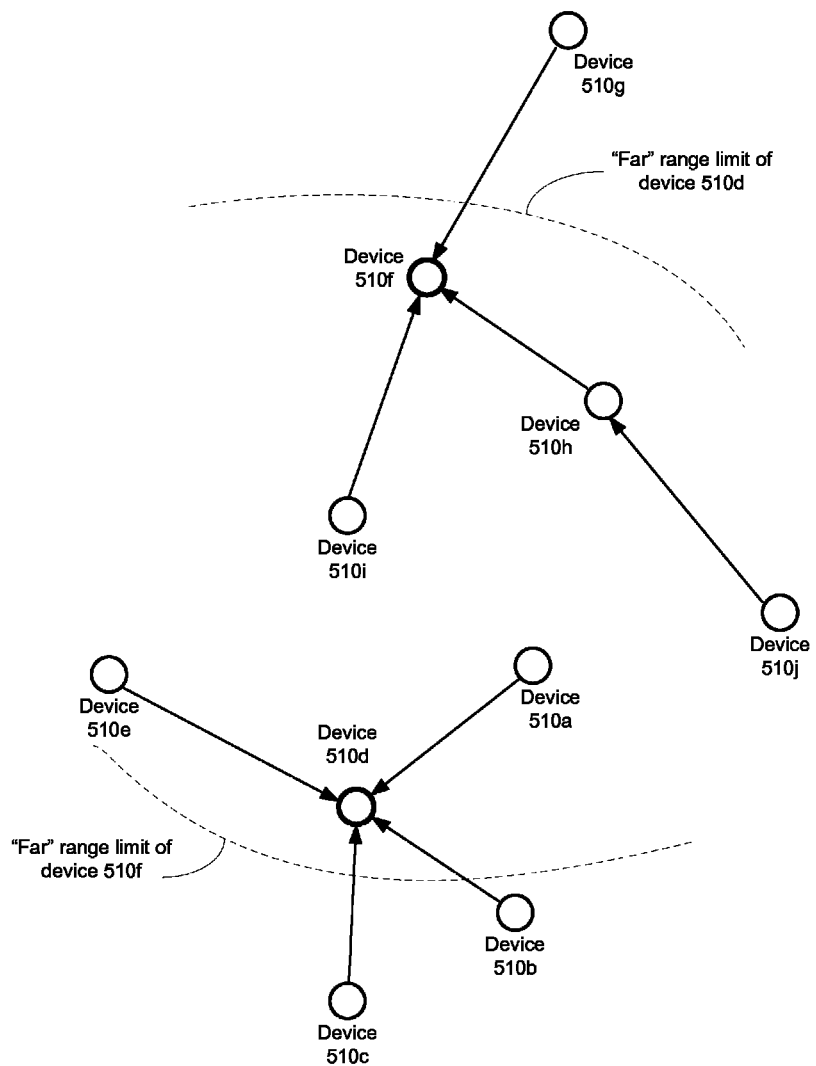

FIG. 5C shows the devices of FIG. 5A when far-range master selection and synchronization begins. Although complete range rings are not depicted in FIG. 5C, it may be assumed that the far range of device 510*f* encompasses all devices except devices 510*b*, 510*c*, and that the far range of device 510*d* includes all devices except device 510*g*. Therefore, all devices are within far range of at least one of the two top devices.

Root synchronization station 510*f* will continue issuing PSFs and advertising its sequence of availability windows unabated, because even at far range it doesn't hear any synchronization frames reporting a sync station having a higher master preference value. Root synchronization station 510*d*, however, quickly learns that device 510*f* has a better preference value. Device 510*d* may learn this directly from a PSF of device 510*f* or from a PSF issued by one of the devices 510*h*, 510*i* acting as stratum 1 branch sync stations under root sync station device 510*f*.

However, because device 510*d* does not hear any device in range better suited to be a stratum 1 branch sync station, it starts issuing PSFs advertising the schedule of availability windows dictated by root sync station 510*f*, announcing its position in stratum 1, and reporting its own preference value and that of device 510*f*.

Other devices within close range of device 510*d* that may have been acting as stratum 1 branch sync stations would hear device 510*d* and stop issuing PSFs as level 1 sync stations, because device 510*d* has the second highest master preference value, exceeded only by root synchronization station 510*f*, and because the threshold number of better masters at which they must cease acting as master is one. In this illustrative environment, because the maximum depth of the hierarchy is two (i.e., strata 0 and 1), there will not be any branch sync stations at stratum 2.

Devices 510*a*, 510*b*, 510*c*, 510*e* will remain synchronized to device 510*d*, as leaf devices (none of them can be sync stations), but will adhere to the new availability window schedule promulgated by device 510*f* and now advertised by device 510*d*. In the illustrated embodiment of the invention, devices 510*a*, 510*b*, 510*c*, 510*e* do not listen for far-range devices, because none of them were root sync stations, and therefore they do not synchronize directly with device 510*f*. In other embodiments in which they do listen for the best far-range sync station, they may synchronize directly with device 510*f*.

Device 510*j* had been synchronized with device 510*h* acting as a level 1 branch sync station. Because device 510*h* does not listen for far-range devices (it was not a root sync station), it does not hear device 510*d*, and therefore it may still be the best level 1 branch sync station candidate within close-range of device 510*j*. If so, device 510*j* remains synchronized with device 510*h*.

This leaves device 510*g* as the only device that does not hear the threshold number of stratum 1 sync stations.

Because it was not a root sync station, it is still only listening for close-range devices. It will therefore begin sending PSFs similar to those of device 510d, placing itself in stratum 1 and announcing its master preference value.

Figure 5D:
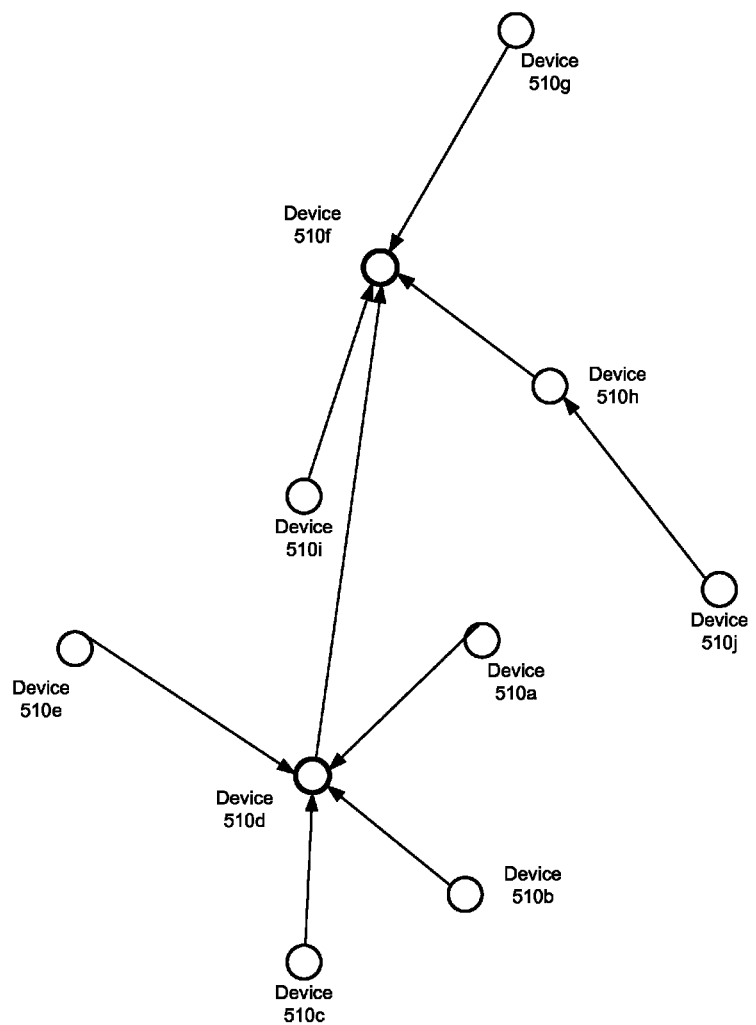

FIG. 5D depicts the hierarchy formed by merging the two separate hierarchies of FIG. 5B, according to some embodiments of the invention.

After an overall root sync station is selected, all synchronization stations in the hierarchy advertise the same schedule and sequence of availability windows. Therefore, synchronizing to one master instead of another within the same hierarchy makes little difference. However, devices must comply with any applicable environmental configuration parameters (e.g., maximum depth of hierarchy, maximum number of sync stations within a given range).

As shown in FIGS. 5A-D, in some embodiments of the invention peer devices first organize themselves into a close-range hierarchy. Shortly thereafter, these localized clusters merge into a single synchronized environment. In the illustrated embodiment, just top close-range sync stations looked (or listened) beyond close range, and so few devices needed to change from being synchronized with one device to being synchronized with another. In another embodiment in which more (or all) devices look further out, more devices would likely change synchronization from their local or close-range sync station to a far-range sync station.

When a root sync station at close range looks beyond close range, based on its master preference value it may change strata or may remain at the same level. Branch sync stations under that root sync station may likewise change levels. For example, in an environment that provides for sufficient depth, if a close-range root sync station is demoted after it competes at longer range, its branch sync stations may automatically be demoted by the same number of levels in order to maintain the relative organization.

As one alternative to this, however, after the close-range sync station's new stratum is determined, its branch sync stations may restart the selection process to settle the close-range hierarchy below that close-range sync station.

In some embodiments of the invention, a peer device cannot arbitrarily nominate itself (e.g., by issuing PSFs) to be a synchronization station at just any level of the hierarchy. When a device hears a sync station, regardless of that station's stratum S, and assuming that sync station has a higher master preference value than the device, the device can become a leaf under that station or, if it does not hear the threshold number of lower-level stratum S+1 branch sync stations, it may bid to become a branch sync station at level S+1.

A Second Illustrative Process for Selecting Synchronization Stations

Figure 6:
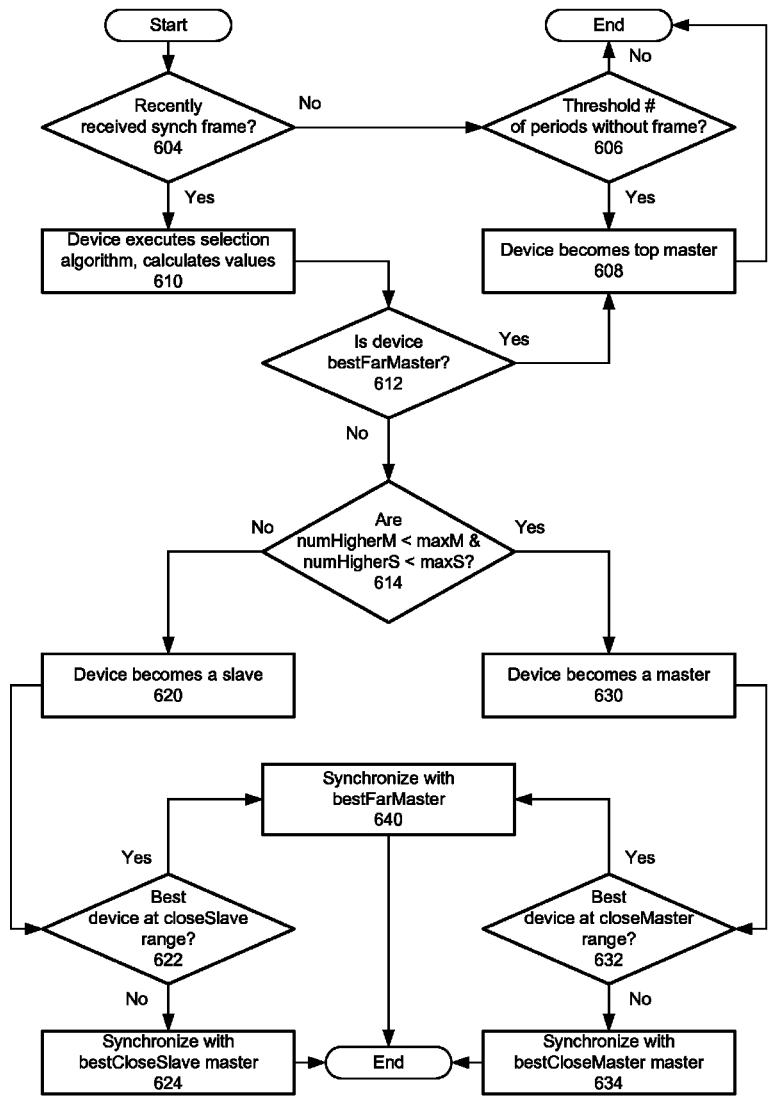
FIG. 6 is a flow chart demonstrating a method of selecting one or more synchronization stations in a peer-to-peer communication environment, according to some embodiments of the invention.

FIG. 6 is a flowchart demonstrating a method of selecting one or more synchronization stations in a peer-to-peer communication environment, according to some embodiments of the invention. The illustrated method may be executed before, during or after every availability window, after some subset of all availability windows (e.g., after the first or last window in the sync station's specified sequence), after some multiple of availability windows (e.g., after every two windows) or with some other regularity, and differs from the selection process depicted in FIGS. 5A-D.

The illustrated process makes use of multiple ranges, which may or may not correspond to the close, mid and far ranges applied in the preceding sub-section.

In embodiments of the invention reflected in the flowchart of FIG. 6, a leaf device will synchronize with the best sync station that it hears with a signal strength greater than the signal strength corresponding to a range termed "closeLeaf." A branch sync station will synchronize with the best sync station that it hears within a "closeMaster" range, which corresponds to a different signal strength; this station may be the root sync station.

For comparison, closeMaster range is greater than close-Leaf range, meaning that the signal strength threshold associated with the closeLeaf range is higher than the signal strength threshold associated with the closeMaster range. This promotes local clustering of leaf devices, while a branch sync station is able to synchronize with a better sync station that is further away.

A "far" range may be used to denote the furthest distance at which any device will listen. Thus, while the "far" range is greater than both closeLeaf and closeMaster ranges, the corresponding signal strength is lower than the signal strengths corresponding to those ranges.

In the illustrated process, if the best peer device that a given device hears at closeLeaf range (if it is a leaf) or at closeMaster range (if it is a synchronization station) is that device itself, it will synchronize with the best sync station it hears at far range. In some implementations, every device will keep track of the best sync stations it hears at far range and at either closeLeaf or closeMaster range (whichever is appropriate), and will store (e.g., in memory) their synchronization parameters and master preference values.

Beyond the three ranges described above, which are used to identify which sync station a given device should synchronize with, other ranges may be used to help determine the given device's role (e.g., synchronization station or leaf) or whether it should continue competing to be a sync station. For example, a device may track the number of sync stations that it hears within two ranges, termed shortRange and midRange.

In an illustrative implementation, shortRange may be approximately one meter, closeLeaf and closeMaster ranges may be on the order of four and five meters, midRange may be between five and ten meters, and far range may be approximately thirty meters. In other embodiments of the invention, a master selection process may consider fewer or additional ranges, which may extend virtually any distances and which may correspond to varying signal strengths.

Thus, one set of ranges (e.g., closeLeaf, closeMaster, midLeaf, midMaster, far) may be used to determine what master station a given device will synchronize with. A different set of ranges (e.g., shortRange, midRange) may be used to identify the device's role.

In operation 604, a device determines whether it has recently received a synchronization frame (e.g., a PSF, an MIF) from the sync station with which it is synchronized. If one has been received within the last PSF period, or within some other applicable time period (e.g., an availability window period), the method advances to operation 610; otherwise, the method continues at operation 606.

In operation 606, the device determines whether a threshold number of availability windows or availability window time periods (or other applicable time periods) have passed without receiving a synchronization frame. If so, the method continues at operation 608; otherwise, the device maintains its current state and current synchronization and exits the illustrated method without executing the master selection process. Although no significant corrective action need be taken (because the number of missed PSFs has not hit the threshold), the device has not recently synchronized and may not have current master preference values to use to select a sync station.

In operation 608, the device becomes root sync station of the peer devices' hierarchy, but may maintain the previous root sync station's sequence or schedule of availability windows and PSF periodicity unless they conflict with other operation of the device. A goal when any sync station is replaced, including the root, is to maintain synchronization within the environment; therefore, the preference is to continue with the same synchronization parameters if possible. After operation 608, the master selection process ends for the device.

In operation 610, the device begins executing the applicable master selection algorithm, using preference values (or selection metrics) that it has received via synchronization frames (e.g., PSFs, MIFs) and/or heard from other devices (e.g., sync stations to which it is not currently synchronized) or that have been relayed by other devices. In particular, the device will compare its master preference values to those of other devices.

As described above, sync stations may be examined at different ranges. In these embodiments, the RSSI (Received Signal Strength Indication) of synchronization frames received from station candidates, or some other measurement of the strength of other devices' signals, such as RCPI (Received Channel Power Indicator), may be used to determine their range.

As part of operation 610, the device calculates several values relative to the device executing the method of FIG. 6, including the following (the ranges are described above):

| | |
|---|---|
| bestFarMaster | Identity (e.g., address) of best sync station within far range |
| bestCloseLeaf | Identity (e.g., address) of best sync station within closeLeaf range |
| bestCloseMaster | Identity (e.g., address) of best sync station within closeMaster range |
| numHigherM | Number of sync stations within midRange that have higher master preference values |
| numHigherS | Number of sync stations within shortRange that have higher master preference values |

In comparing master preference values, in some embodiments of the invention a device will compare itself to each of one or more other devices it can hear, and rank itself in comparison to them, using the following rules.

Rule 1: If the device is the root sync station and the other device is in the root's tree (or vice versa), or if the device is a leaf and the other device is the device's current synchronization station (or vice versa), then their master preference values are compared. The device with the higher preference value wins and is ranked higher; if equal, their MAC addresses are compared and the higher (or lower) MAC address wins.

Rule 2: If Rule 1 does not apply and neither device is the root sync station, but they are in the same tree, the comparison depends on their strata. If they are in different strata, the device in the lower-numbered stratum (i.e., closer to the root) wins. If they are in the same stratum, the device with higher master preference value wins; if equal, their MAC addresses are compared.

Rule 3: If the devices are in different hierarchies (i.e., they do not have the same root sync station), the master preference values of their root sync stations are compared. The device whose root sync station has the higher preference value wins; if equal, the MAC addresses of their root sync stations (or the devices themselves) are compared.

Rules 1 and 2 promote stability of the synchronization hierarchy while generally establishing the shortest path from a given device to the root synchronization station of the hierarchy. Rule 3 ensures that two separate hierarchies in proximity to each other have the opportunity to merge into a single hierarchy.

In operation 612, the device determines whether it is bestFarMaster (i.e., has the highest master preference among all devices within far range of the device). If so, the method returns to operation 608; otherwise, the method proceeds to operation 614.

In operation 614, the device determines whether numHigherM (i.e., the number of sync stations within midRange that have higher master preference) is less than a threshold or maximum number of midRange sync stations (maxM), and whether numHigherS (i.e., the number of sync stations within shortRange that have higher master preference) is less than a threshold or maximum number of shortRange sync stations (maxS). If so, the method advances to operation 630; otherwise, the method continues at operation 620.

In some embodiments of the invention, the method may advance to operation 630 from operation 614 if either numHigherM is less than maxM or numHigherS<maxS (i.e., an "or" operation is performed instead of an "and" operation).

In operation 620, the device appoints itself as a leaf, because even if it has a higher preference value than some other devices, a threshold number of sync stations within shortRange that have higher values are already in position. If the device had been issuing periodic synchronization frames, it ceases.

In operation 622, the device determines whether it is the best device within closeLeaf range (i.e., the best candidate within closeLeaf range). If so, the method advances to operation 640; otherwise, it continues at operation 624.

In operation 624, the device synchronizes with bestCloseLeaf (i.e., the sync station within closeLeaf range that has the highest master preference value). The method then ends.

In operation 630, the device assumes the role of a synchronization station. This will require it to issue periodic synchronization frames and manage a sequence of availability windows to synchronize other peer devices.

In operation 632, the device determines whether it is the best device at closeMaster range (i.e., the device within closeMaster range with the highest master preference value). If so, the method advances to operation 640; otherwise, it continues at operation 634.

In operation 634, the device synchronizes with bestCloseMaster (i.e., the best sync station within closeMaster range). The method then ends.

In operation 640, the device synchronizes with bestFarMaster (i.e., the device within far range with the highest master preference value), which may be the root sync station. The method then ends.

FIGS. 7A-E depict execution of the master selection process of FIG. 6 according to some embodiments of the invention.

Figure 7A:
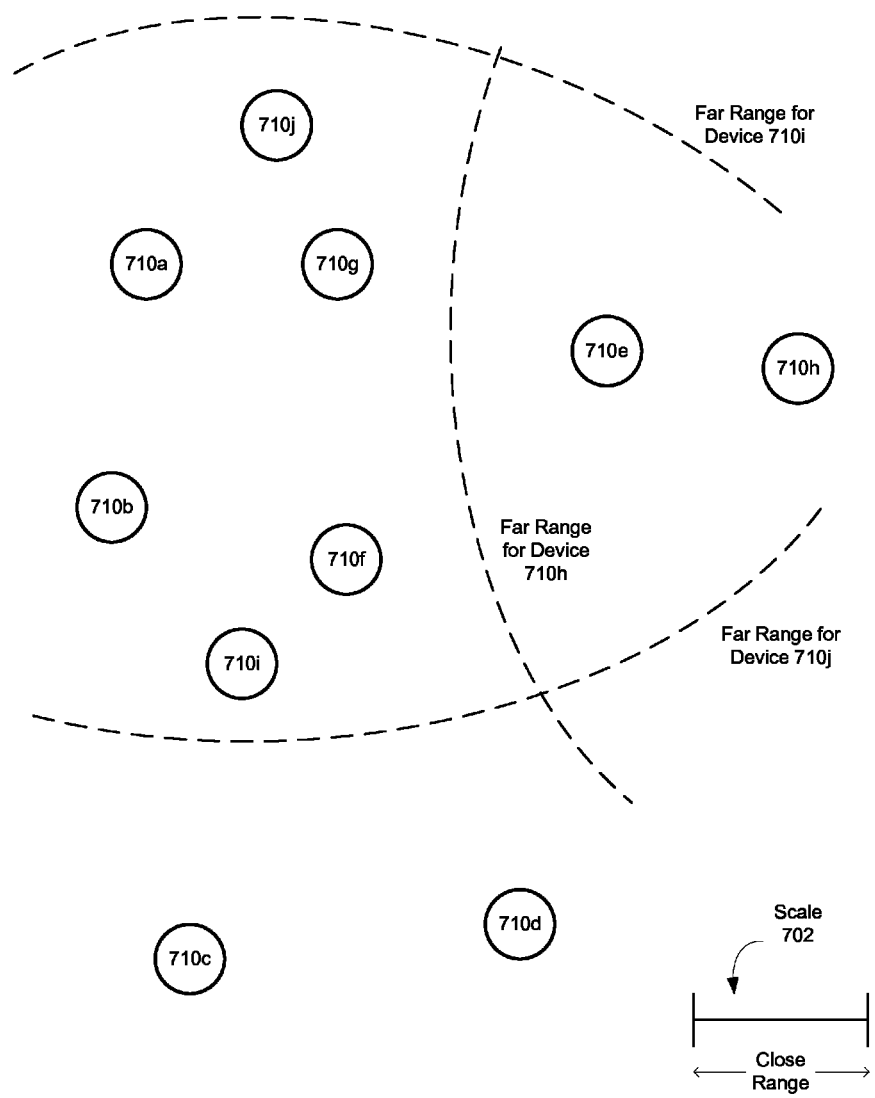
FIGS. 7A-E depict execution of the method illustrated in FIG. 6, according to some embodiments of the invention.

FIG. 7A illustrates a collection of peer devices distributed within an environment. Device labels indicate the devices' rankings in reverse order of their master preference values (and their MAC addresses if two devices' metrics tied), wherein device 710a<device 710b<device 710c< . . . <device 710i<device 710j. Thus, of all the devices in the environment, device 710j is considered the "best" device in the environment.

As discussed above, multiple different ranges are relevant to the selection of sync stations and synchronization of the devices. Limits of "far" ranges for the top three devices (devices 710h, 710i, 710j) are shown in FIGS. 7A-E, along with scale 702 demonstrating an illustrative "close" range. In the illustrated embodiment, closeLeaf and closeMaster ranges (as described above with regard to FIG. 6) are equal and match the close range represented by scale 702.

Figure 7B:
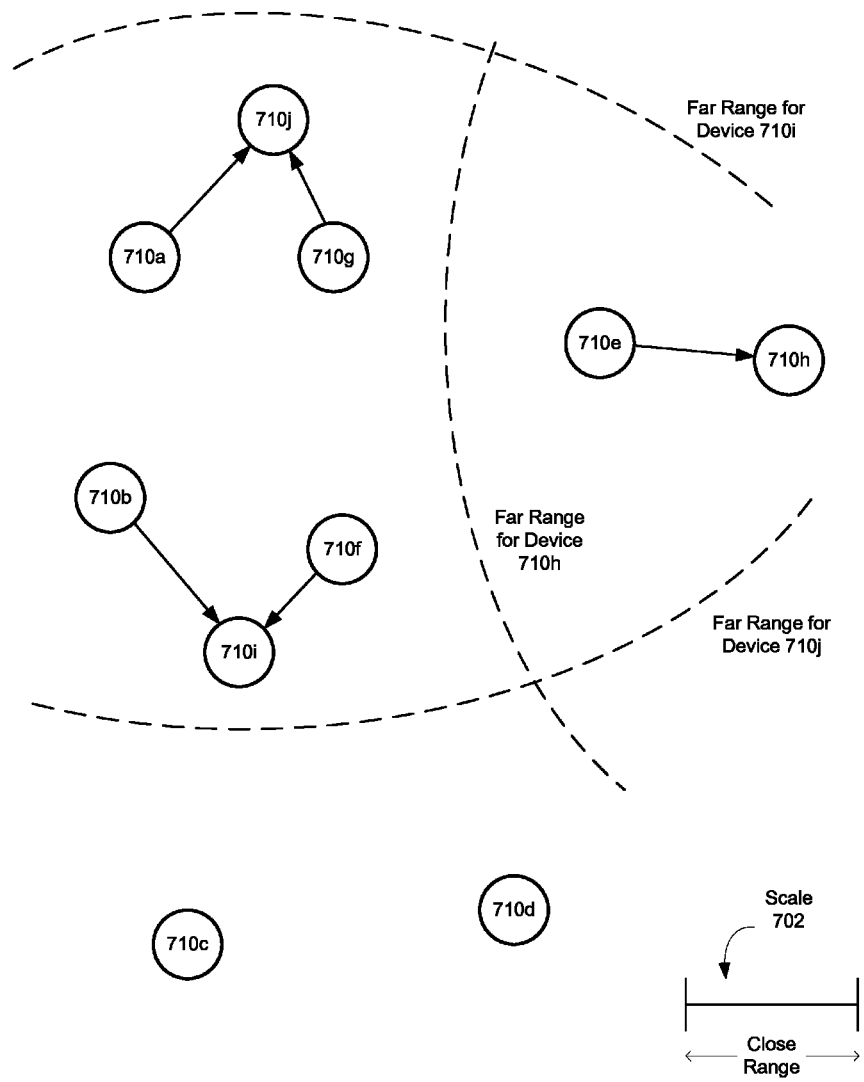

FIG. 7B illustrates the close-range connections that are established when each device synchronizes with the closest sync station it can hear (e.g., in operation 634). In the illustrated scenario, most devices are within close range of one of the top three devices, and therefore synchronize with one of those devices. Devices 710*c*, 710*d*, however, find no other devices within close range, and therefore continue unsynchronized for now (i.e., in their own one-device hierarchies).

It may be noted that some devices (e.g., devices 710*b*, 710*e*, 710*f*) can hear better sync stations than those they initially synchronize with, but are only looking for the closest sync station, not the best that they can hear. Also, all devices may still be sending synchronization frames, because no device has yet found reason to become a leaf.

Figure 7C:
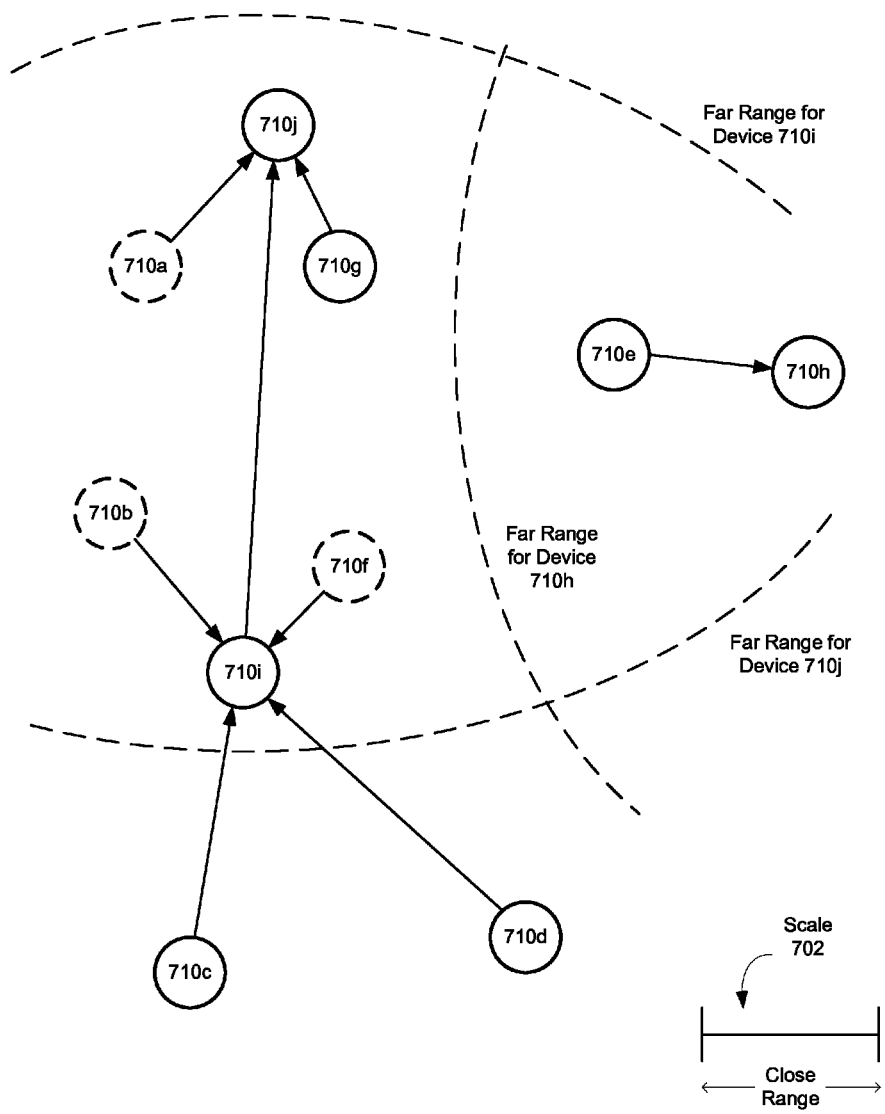

FIG. 7C depicts the environment as sync stations listen for and connect to better sync stations at far range. For example, and according to the method illustrated in FIG. 6, devices 710*c*, 710*d*, 710*i* became sync stations at operation 630, discovered they were the best sync stations within close range in operation 632, and then implemented operation 640, wherein they synchronized with the best sync station within far range. Thus, device 710*i* synchronizes with device 710*j* and devices 710*c*, 710*d* synchronize with device 710*i*.

Also, some devices now transition to leaf status because they hear threshold numbers of synchronization stations having better preference values at short and/or mid-range. For example, and following the method depicted in FIG. 6, devices 710*a*, 710*b* (and/or others) reach operation 614 and determine how many sync stations they hear at short range and at mid-range. One or both of these values equal to or exceed their thresholds, and so the devices implement operations 620, 622 and 624 to become leaves synchronized to the best sync station within closeLeaf range. Illustratively, both short range and mid-range are longer distances than close range, but less than far range.

The dashed outlines of devices 710*a*, 710*b* and 710*f* indicate that they are now leaf devices. As leaves, they cease issuing periodic synchronization frames.

Also with reference to FIG. 7C, non-leaf devices commence or continue issuing synchronization frames advertising their master preference values and the preference values of their root synchronization stations. For example, device 710*e* will advertise preference values of devices 710*e* and 710*h*, and device 710*g* will advertise preference values of devices 710*g* and 710*j*.

Figure 7D:
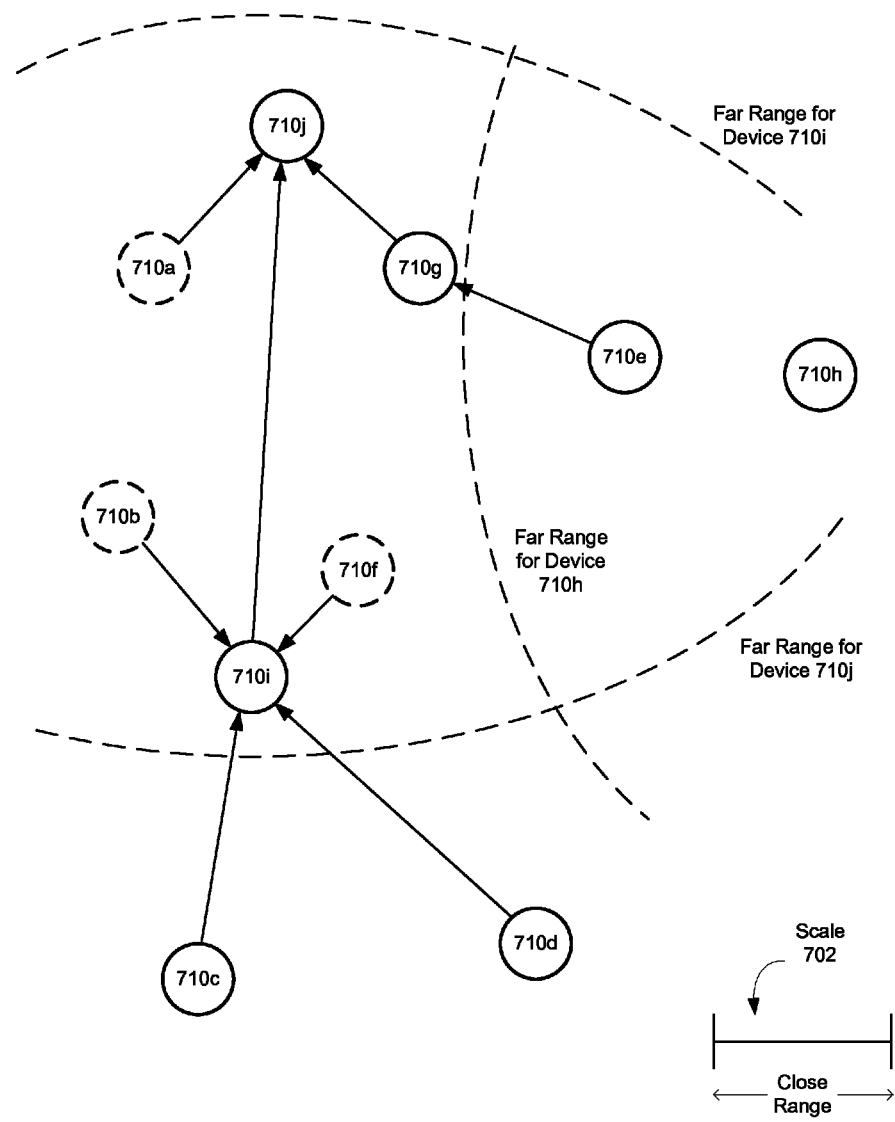

FIG. 7D depicts the environment after device 710*g* is physically moved closer to device 710*e*, but still beyond the far range of device 710*h*. In particular, device 710*g* moves within close range of device 710*e*.

Via its synchronization frames, device 710*g* advertises its master preference value and that of device 710*j*. When device 710*e* compares these values as part of the master selection process, it will note a preference for device 710*j* over device 710*h*. Therefore, device 710*e* will now synchronize with device 710*g*.

Figure 7E:
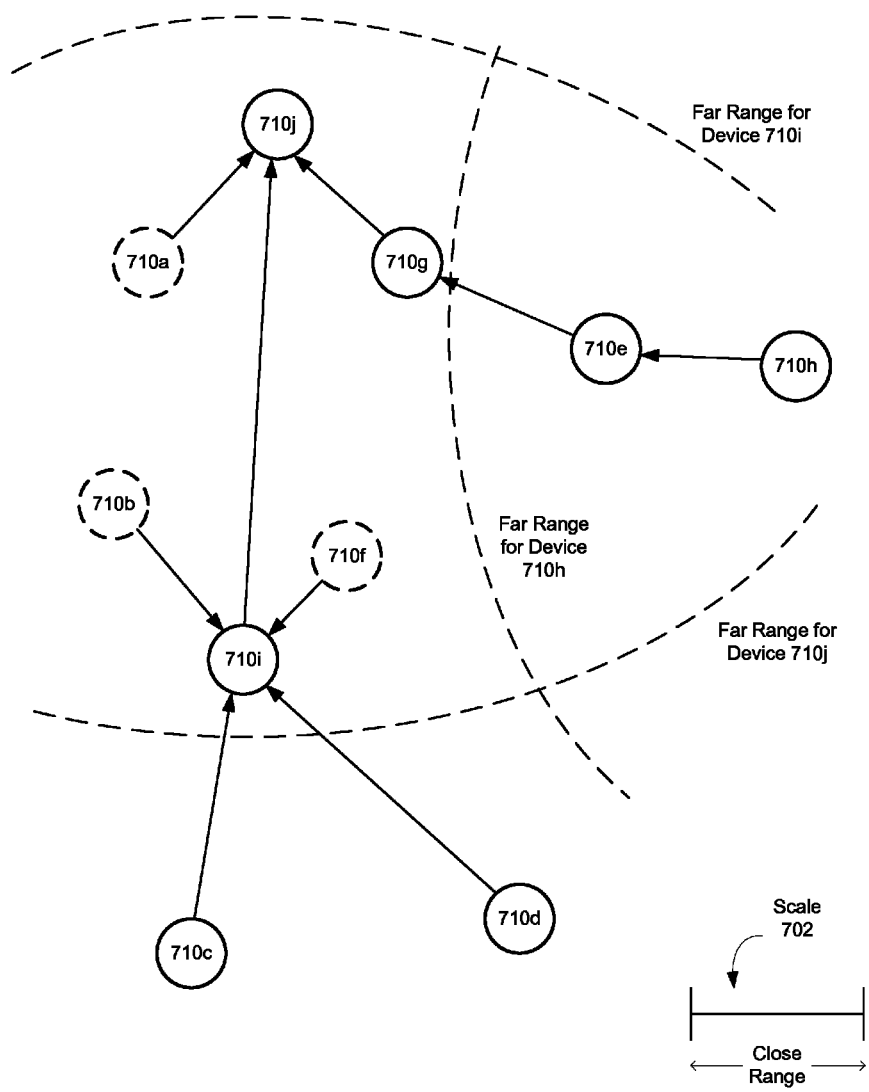

In FIG. 7E, device 710*e* has begun issuing synchronization frames advertising its preference value and that of its new root sync station, device 710*j*. Device 710*h* will compare the master preference value of device 710*j* to its own, and see that device 710*j* is the preferred root.

Device 710*h* may therefore synchronize with the extended hierarchy of device 710*j* if, as shown in FIG. 7E, the maximum depth parameter of the hierarchy permits. If device 710*e* was at the maximum depth of the hierarchy, then device 710*h* would begin its own hierarchy.

In some embodiments of the invention, a master selection algorithm or process is continuous. In these embodiments, the process restarts or repeats with every availability window, and may therefore take some time before all devices are placed at their "correct" level in the hierarchy. As devices move into, within and out of the environment, the hierarchy may continually change.

However, it should be noted that synchronization of devices happens much more quickly and will not be degraded by the ongoing master selection process. That is, synchronization does not depend on having every device in its correct logical position.

In particular, even though the devices acting as the root synchronization station and branch sync stations of a hierarchy may change over time, this will not interrupt synchronization in most implementations. In these implementations, the same availability window schedule is applied throughout the hierarchy; therefore, any device newly assuming the root sync role (or a branch sync role) will already be synchronized with the other devices and they will be synchronized with it.

In some embodiments of the invention, the selection metrics used to compute a device's master preference value include its transmission range and power level. As a simple example, a device with higher transmission power or range will have preference to be a sync station over all devices having less transmission power/range. As the device's power reserves diminish, its preference value will likewise decrease. In other embodiments, other metrics may be considered.

In these embodiments, if transmission powers/ranges are not available (or if there is a tie between devices), the device having the highest remaining battery charge will have the higher preference value. If both transmission range and battery charge are unknown (or tie), devices' MAC addresses (or other addresses/identifiers) may be compared.

Because selection of synchronization stations is a continuous or regular process in these embodiments, the cost of being a sync station (e.g., power usage) is shared among different peers. As one sync station's power level decreases (e.g., because of regularly issuing periodic synchronization frames), another device will take its place.

A Third Illustrative Process for Selecting Synchronization Stations

In some embodiments of the invention, a different process may be applied to determine the role a particular device will assume in an environment—that of the root synchronization station, a branch synchronization station or a leaf. In these embodiments, to facilitate regular execution of the selection algorithm every device in a synchronized hierarchy maintains one or more lists of potential (and current) synchronization stations. Each entry in a list identifies one device, and includes attributes such as its master preference value (or master selection metrics) and a unique identifier (e.g., MAC address or some other address).

When a device executes a process to determine its role, it uses the list to identify those peer devices with the best preference values. A tie among multiple devices may be settled by considering the devices' MAC addresses or other unique identifiers or attributes.

A device's list of sync station candidates may include entries for every peer that the device can hear, or just those peers that it can hear within a particular range (e.g., with a signal strength greater than a threshold). Further, only those peer devices that the device hears directly may be listed, or peers that it learns of indirectly (e.g., from frames forwarded or repeated by other devices on behalf of the devices that originated the frames) may also be listed.

In different embodiments of the invention, different lists may be assembled for selecting peer devices to fill different roles (e.g., root synchronization station, branch synchronization station), or one list may be used in different ways for selecting all sync stations.

Figure 9:
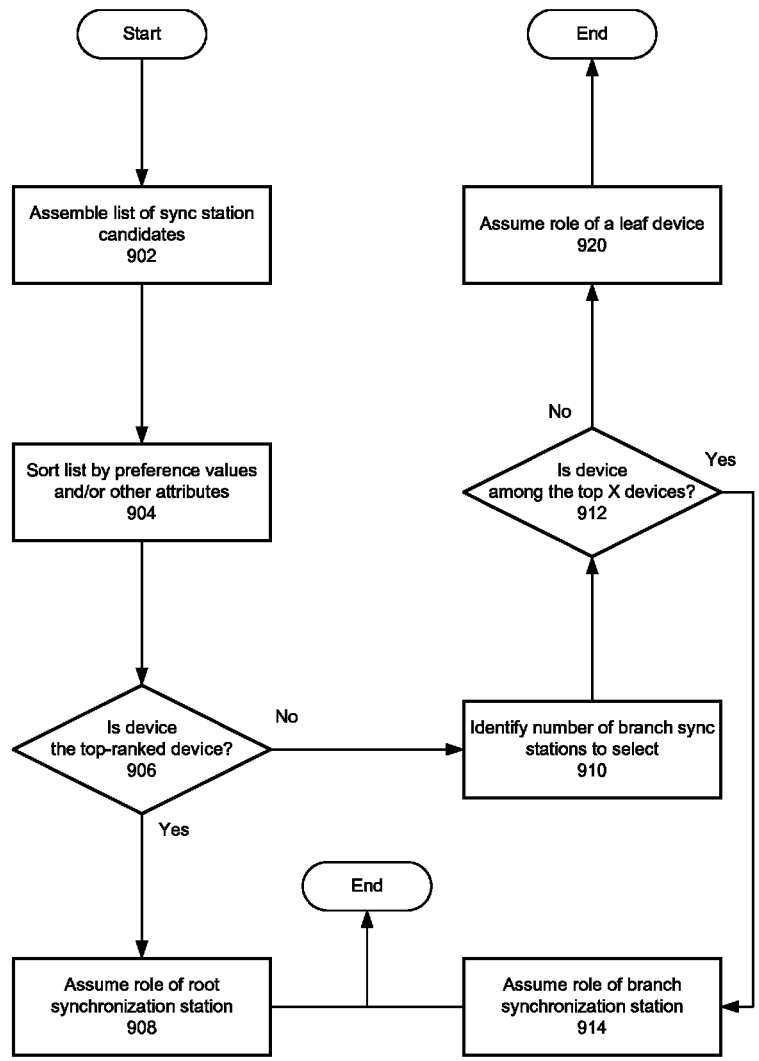
FIG. 9 is a flowchart demonstrating a method by which a device determines its proper role within an environment of synchronized peer devices, according to some embodiments of the invention.

FIG. 9 is a flowchart demonstrating a method by which a device determines its proper role within an environment of synchronized peer devices, according to some embodiments of the invention. Each peer device will perform the same method, thereby ensuring that only one device attempts to assume position as the root sync station, and that suitable other devices take positions as branch sync stations.

In operation 902, the device executing the illustrated process assembles a list of peer devices that it hears directly and/or that it hears of indirectly via communications of intervening devices. For example, in a periodic synchronization frame transmitted by a branch sync station with which the device has synchronized, attributes of that branch sync station and the root sync station of the hierarchy will be reported. For each peer device represented in the list, its preference value and unique identifier (e.g., MAC address) are noted. The device includes itself in the list.

In operation 904, entries in the list are sorted or ordered by preference value. In the event of a tie between multiple devices, entries for the affected peer devices will be ordered by their unique identifiers.

In operation 906, the device determines whether it is the top-ranked device that it knows of within the environment. The top device will be recognized as root synchronization station by all peer devices that have that device in their lists, and will automatically take over that role if it is not already acting in that capacity. If the device is top-ranked, the method continues at operation 908; otherwise, the method advances to operation 910, In operation 908, the device that is performing the illustrated method realizes that it is the preferred root synchronization station, and so it will begin issuing periodic synchronization frames (if it was a leaf device), change the content of the frames it issues (if it was a branch sync station) or continue issuing PSFs in the way it had been doing (if it was already the root sync station).

More particularly, when a device assumes position at the root of the hierarchy, it will usually maintain the same sequence or schedule of availability windows that had been in effect beforehand. If necessary, it may make slight adjustments to accommodate other usage of its radio. Also, in its PSFs, it will identify itself as the root sync station and advertise its preference value and/or pertinent metrics. Branch synchronization stations will propagate the availability window schedule throughout the hierarchy, and will also adjust their PSFs to identify the new root station. As described previously, branch sync stations' PSFs may identify the root sync station (e.g., by MAC address), identify their own strata in the hierarchy, report preference values of the root sync station and themselves, etc. After operation 908, the illustrated method ends.

In operation 910, the device identifies how many branch sync stations are permitted. This configuration parameter may be programmed into the peer devices and/or a value may be disseminated in periodic synchronization frames as part of a set of configuration parameters of the hierarchy. If no branch sync stations are needed, the method may skip to operation 920. Illustratively, in a small, localized environment, the root sync station may be sufficient to keep all peer devices synchronized (assuming they are all in range of that station).

In some implementations, the number of branch sync stations to be selected is expressed as a maximum number of sync stations that a device may hear directly, including the root sync station, and not an absolute maximum number of sync stations throughout the hierarchy. In particular, if X is the maximum number of synchronization stations that are permitted within range of each other, then X is the number of branch sync stations to be selected as branch synchronization stations, or X−1 if the root synchronization station can be heard.

When selecting or identifying a branch synchronization station, the device executing the process of FIG. 9 is only concerned with peer devices that are relatively nearby. Therefore, instead of considering all peers that it knows of, it will only consider those within a first range or those whose signal strengths exceed a first threshold.

In some implementations, a peer may be dropped from consideration as a branch sync station if its distance from the device exceeds a second range or its signal strength falls below a second threshold. The first and second ranges/thresholds will be sufficiently different to prevent (or at least diminish) thrashing, wherein a particular peer device continually oscillates between being close enough and being too far away to be considered (e.g., because of signal fluctuations or environmental factors).

In operation 912, the device determines whether it is among the top X devices of the list (i.e., the X devices with the best preference values), or X−1 devices if the root sync station is also within the threshold range. If there are fewer than X nearby peer devices, then all of those peers will be branch sync stations. If the device is among those peer devices that should be branch sync stations, the method continues with operation 914; otherwise, the method advances to operation 920.

In operation 914, the device performing the illustrated method takes position as a branch sync station and starts issuing periodic synchronization frames, or continues issuing them if it already was a branch sync station. Also, the device synchronizes with the best device that it can hear, which will be either the root sync station or another branch sync station.

Alternatively, from among the top X devices that it can hear directly, the device may synchronize with the branch synchronization station that is closest to the root sync station; that is, the branch sync station that has the lowest stratum value. Advantageously his may help balance the tree and reduce the synchronization path depth.

However, if the station that the device would otherwise choose to synchronize with is a branch sync station already at the maximum depth (e.g., stratum) of the hierarchy, the device cannot be a branch sync station under that station, and so it becomes a leaf under that station instead. In some alternative implementations, the device may instead synchronize with a different sync station (e.g., even one with a lower preference value). After operation 914, the illustrated method ends.

In operation 920, the device does not have preference to be a synchronization station, and so it takes position as a leaf device. The device will synchronize with the highest-rated synchronization station it can hear (i.e., the station with the highest preference value) within a threshold range (or with a signal strength exceeding a threshold), which may be the root synchronization station, and will refrain from issuing synchronization frames. Alternatively, the leaf device may synchronize with the branch synchronization station that is closest to the root sync station; that is, the branch sync station that has the lowest stratum value. After operation 920, the method ends.

In some implementations, separate lists may be maintained for identifying the root synchronization station and for identifying branch sync stations. All peers that can be heard may be considered for selection as the root station, while only those peers within a particular range are considered for selection as branch stations. Alternatively, a single list may be maintained, but augmented (e.g., with range values or signal strengths) to allow it to be used for all selections.

The list (or lists) maintained by a device to facilitate identification or selection of synchronization stations may be updated continually. Besides adding new devices that are heard or learned of, the device will delete from the list peers that have been quiet or not heard of for some time period.

For example, when a peer is added to the list, a timer may be initiated. If nothing is heard from or about that peer for a predetermined time period, it may be dropped.

A Peer Device

Figure 8:
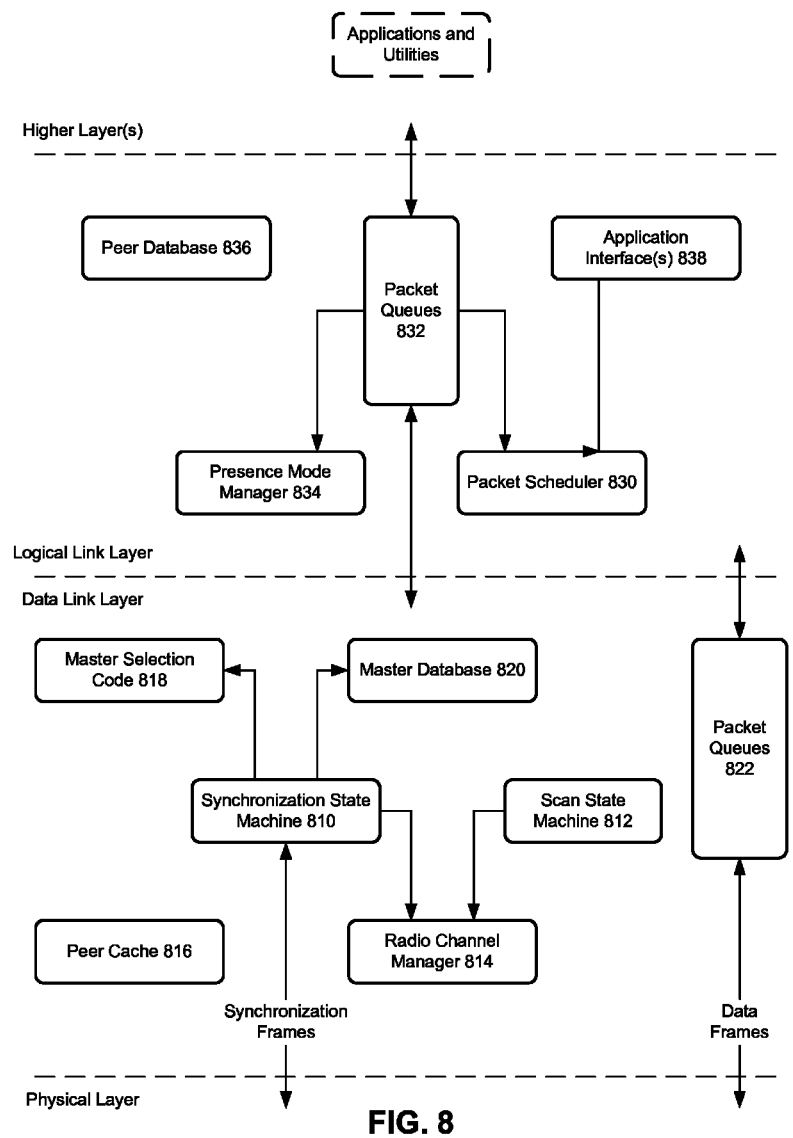
FIG. 8 is a block diagram of a peer device, according to some embodiments of the invention.

FIG. 8 is a block diagram of a peer communication device, according to some embodiments of the invention. Two primary protocol layers or operating layers are depicted in FIG. 8—the Logical Link Layer and the Data Link Layer. Above the logical link layer one or more applications and/or utilities (e.g., mDNS, Bonjour) may operate; below the data link Layer is the Physical Layer, responsible for transmitting frames over, and receiving frames from, the transmission medium.

In some embodiments of the invention, the Logical Link layer and Data Link layer may be physically implemented by separate processors or by integrated circuits residing on a single component. In the illustrative communication device of FIG. 8, some components of the device are omitted in the interest of clarity, such as processor, memory, display, antenna and communication port components, among others.

Within the data link layer, synchronization frames (e.g., periodic synchronization frames or PSF, master indication frames or MIF) are issued by and/or received by synchronization state machine 810. Incoming synchronization frames are routed to master database 820 and then passed upward to the logical link layer. Data frames are handled by packet queues 822.

Synchronization state machine 810 has two modes—leaf and master—and runs continuously in some implementations. As discussed earlier, a master device, also known as a synchronization station, is a device that issues periodic synchronization frames, while a leaf device does not, but is synchronized with a master.

The state machine is responsible for synchronization of the peer device to its current sync station (e.g., if the device is a leaf). If the device is a master, state machine 810 manages its transmission of periodic synchronization frames and/or master indication frames, and also manages its availability window presence.

Scan state machine 812 scans social channels for periodic synchronization frames. Radio channel manager 814 manages radio resources (e.g., a shared antenna) with other entities (e.g., an infrastructure module) and between different radios (e.g., Wi-Fi, Bluetooth). Synchronization state machine 810 interacts with radio channel manager 814 to switch the device's radio to the correct channel for an availability window, at the appropriate time. Scan state machine 812 and/or other components of the device may interact with the radio channel manager for other purposes (e.g., scanning a channel for new devices).

Peer cache 816 stores relevant information of a limited number of other devices with whom the host peer device is communicating or is about to communicate. Use of this cache may help alleviate problems associated with memory restrictions in some hardware/firmware implementations. For example, the Data Link Layer may be implemented by a dedicated Wi-Fi chipset, which typically does not have access to large memory banks Information in peer cache 816 is synchronized with information in peer database 836.

Master selection code 818 is periodically executed to perform a process for selecting masters, or synchronization stations, using information from peer database 836 and/or other information. For example, execution of the code may cause a ranking of devices in master database 820, based on their suitability to be a sync station.

Master database 820 stores data regarding all masters that the peer device is aware of. Such data may be used for synchronization and/or master selection, and may include, but is not limited to, RSSI (e.g., of latest frame, average of multiple frames, minimum, maximum), master preference values, selection metrics and synchronization parameters.

In some embodiments of the invention, master database 820 is populated or updated, and master selection code 818 executed, upon receipt of every periodic synchronization frame.

Packet queues 822 of the data link layer stores incoming and/or outgoing data frames. Packet queues 832 of the logical link layer store peer traffic incoming from, and outgoing to, other devices.

Packet scheduler 830 schedules multicast, broadcast and unicast traffic to synchronized devices, and out-of-band inquiries/responses to masters with which the peer is not synchronized ("non-synchronized masters") and to devices synchronized with non-synchronized masters. The peer database stores information regarding the non-synchronized masters' availability windows, presence modes and other timing-related information.

Presence mode manager 834 controls the peer device's presence mode, based on factors that may include, but that are not limited to: current active data links to synchronized devices, current data rates to those devices, scan requirements, out-of-band inquiry requirements, power management state, Bluetooth requirements, other radio requirements, etc.

Peer database 836 identifies all devices known to the peer device illustrated in FIG. 8, and stores information regarding each device. This information may include, but is not limited to, its root master, other masters, master selection metrics, capabilities (e.g., supported frequency bands, channel bandwidths, modulation/data rates), presence mode, services supported by the device, outstanding block ACK agreements, and so on. Peer database 836 may thus assist in a master selection process by providing a list of candidate devices that can be ordered by preference value.

Application interfaces 838 include interfaces to higher system layers and modules, which may include but are not limited to: configuration and network management, a GUI (Graphical User Interface), service advertisement and discovery, and so on. The GUI may present a device user with a list of surrounding peers, their physical proximities, range or signal strengths, lists of their service, and/or other information.

The configuration of the peer device presented in FIG. 8 is exemplary. In other embodiments of the invention a peer device's configuration may differ to varying degrees.

Some embodiments of the invention promote coexistence of a peer-to-peer communication protocol, as described herein, with other applications that require the radio or other communication resources of a peer device. For example, the device may operate an application or another protocol, such as Bluetooth®.

In these embodiments, Bluetooth communications can be performed as desired, except during the device's availability window and any extensions thereto. Outside of the availability window, Bluetooth scans, inquiries and/or other operations are allowed, and may even take priority over data frames adhering according to a protocol provided here.

A master's periodic synchronization frame may be delayed because of a Bluetooth (or other application/protocol) operation using the device's antenna, but normally will not be dropped. Bluetooth or other operations may not be permitted during out-of-band inquiries and responses.

Synchronization and operation of peer devices as provided herein can also coexist with an application or protocol that relies on some communication infrastructure (e.g., an access point) not part of the peer device hierarchy.

The environment in which some embodiments of the invention are executed may incorporate a general-purpose computer or a special-purpose device such as a hand-held computer, smart phone or other mobile device. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs) and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. An apparatus for selecting a synchronization station from among multiple peer devices within a peer-to-peer communication environment, wherein the apparatus comprises a peer device of the multiple peer devices, the apparatus comprising:
    a processor of a hardware module;
    a radio coupled to the processor;
    a memory component coupled to the processor, configured to store a preference value, wherein the preference value is used to select the synchronization station;
    the processor being configured to:
        select the synchronization station from an ordered listing of the multiple peer devices;
        determine that the apparatus has been selected as a branch synchronization station; and
        broadcast synchronization frames comprising:
            a preference value of the apparatus and a preference value of a root synchronization station that receiving devices use for selecting a synchronization station from among the multiple peer devices.

2. The apparatus of claim 1, wherein the ordered listing comprises:
    sorting the multiple peer devices according to their preference values.

3. The apparatus of claim 1, wherein the preference value of the apparatus is calculated based at least in part on a metric of the apparatus.

4. The apparatus of claim 1, wherein the processor is further configured to:
    select a root synchronization station responsible for setting a schedule of rendezvous for the multiple peer devices; and
    select one or more branch synchronization stations responsible for disseminating the schedule of rendezvous throughout the communication environment.

5. The apparatus of claim 3, wherein the metric comprises: an available power resource of the apparatus, a processor load of the apparatus, or a signal strength of the apparatus.

6. The apparatus of claim 1, wherein the broadcast synchronization frames comprise: one or more future availability windows that comprise an identification of a corresponding time and a corresponding channel for each availability window.

7. The apparatus of claim 1, wherein the processor is further configured to:
    operate the radio of the first device to receive communications from the multiple peer devices;
    extract preference values from the communications; and
    update a database to record each preference value in association with a corresponding peer device.

8. A method of identifying a first device's role within a hierarchy of multiple peer devices, wherein the first device comprises a peer device of the multiple peer devices, the method comprising, by the first device:
    collecting preference values of the multiple peer devices, wherein a preference value of a peer device is used to select a synchronization station;
    identifying as a root synchronization station of the hierarchy, a peer device having a highest preference value among the preference values of the multiple peer devices;
    selecting, from the multiple peer devices, a set of devices located within a first range of the first device;
    identifying as branch synchronization stations a subset of the set of devices;
    determining that the first device has been selected as a branch synchronization station of the subset; and
    broadcasting synchronization frames including a preference value of the first device and a preference value of the root synchronization station that receiving peer devices use for selecting a synchronization station from among the multiple peer devices, wherein the collecting, identifying as the root synchronization station, selecting, identifying as branch synchronization stations, determining, and broadcasting are performed using one or more hardware processors.

9. The method of claim 8, wherein collecting the preference values comprises:
operating a radio of the first device to receive communications from the multiple peer devices;
extracting preference values from the communications; and
updating a database to record each preference value in association with a corresponding peer device.

10. The method of claim 8, wherein identifying the root synchronization station comprises:
comparing the collected preference values; and
selecting a peer device with a highest preference value that satisfies a maximum depth of the hierarchy.

11. The method of claim 8, wherein selecting the set of devices located within the first range of the first device comprises:
identifying a threshold signal strength;
comparing signal strengths of communications received from the multiple peer devices with the threshold signal strength; and
choosing a peer device of the multiple peer devices from which a communication was received with a signal strength that satisfies the threshold signal strength.

12. The method of claim 8, wherein identifying the branch synchronization stations comprises:
identifying a maximum number of branch synchronization stations;
sorting the set of devices according to their corresponding preference values; and
from the sorted set of devices, selecting one or more devices having a highest preference value, up to the maximum number.

13. A non-transitory computer-readable medium storing instructions that, when executed by a processor of a first device, cause the first device to perform operations to identify the first device's role within a hierarchy of multiple peer devices wherein the first device comprises a peer device of the multiple peer devices, the operations comprising:
collecting preference values of the multiple peer devices, wherein a preference value of a peer device is used to select a synchronization station;
identifying as a root synchronization station of the hierarchy a peer device having a highest preference value among the preference values of the multiple peer devices;
selecting, from the multiple peer devices, a set of devices located within a first range of the first device;
identifying as branch synchronization stations a subset of the set of devices;
determining that the first device has been selected as a branch synchronization station of the subset; and
broadcasting synchronization frames including a preference value of the first device and a preference value of the root synchronization station that receiving peer devices use for selecting a synchronization station from among the multiple peer devices, wherein the collecting, identifying as the root synchronization station, selecting, identifying as branch synchronization stations, determining, and broadcasting operations are performed using one or more hardware processors.

14. The non-transitory computer-readable medium of claim 13, wherein collecting the preference values comprises:
operating a radio of the first device to receive communications from the multiple peer devices;
extracting the preference values from the communications; and
updating a database to record each preference value in association with a corresponding peer device.

15. The non-transitory computer-readable medium of claim 13, wherein the preference value of the first device is calculated based at least in part on:
a rate of power consumption of the first device;
a frequency band usable by the first device;
a load of a processor of the first device;
a communication range of the first device; or
a type of the first device.

16. A method of a first device to identify the first device's role within a hierarchical community of peer devices, wherein the first device comprises a peer device of the hierarchical community peer devices, the method comprising:
receiving via a radio, periodic synchronization frames broadcast by peer devices of the hierarchical community;
extracting from the received periodic synchronization frames preference values that are used to select a synchronization station;
sorting the peer devices by their preference value;
identifying the first device as a root station in response to the first device having a highest preference value of the peer devices;
identifying the first device as a branch station in response to the first device being among a selected number of the peer devices having a next highest preference value;
identifying the first device as a leaf in response to the first device not being identified as the root station or a branch station;
determining that the first device has been identified as a branch station; and
broadcasting periodic synchronization frames toward the peer devices, the periodic synchronization frames including a preference value of the first device and a preference value of the root station that receiving peer devices use for selecting a role within the hierarchical community,
wherein the receiving, extracting, sorting, identifying the first device as the root station, identifying the first device as the branch station, identifying the first device as the leaf, determining, and broadcasting are performed using one or more hardware processors.

17. A first peer communication device, comprising:
a processor configured to:
extract, from received periodic synchronization frames, preference values of identified peer communication devices associated with the periodic synchronization frames, wherein the preference values are used to select a synchronization station;
identify a role of the first peer communication device within a network of peer communication devices based at least in part on the preference values extracted, wherein the role of the first peer communication device is one of:
a root synchronization station;
a branch synchronization station; or
a leaf device;
determine that the first peer communication device has been identified as a branch synchronization station;
generate synchronization frames that include:
a preference value of the first peer communication device and a preference value of a root synchronization station that receiving peer communication devices use for identifying themselves as one of a root synchronization station, a branch synchronization station, or a leaf device; and one or more future availability windows during which at least one corresponding peer communication device is available for communication; and
a radio coupled to the processor, for broadcasting the synchronization frames.

18. The first peer communication device of claim 17, further comprising:
a memory module coupled to the processor, configured to store preference values of corresponding peer communication devices.

19. The first peer communication device of claim 18, wherein a preference value of the preference values is calculated from a measure of available power of a corresponding peer communication device.

20. The first peer communication device of claim 17, wherein the preference value of the first peer communication device is calculated based at least in part on:
a rate of power consumption of the first peer communication device;
a frequency band usable by the first peer communication device;
a load of the processor of the first peer communication device;
a communication range of the first peer communication device; or
a type of the first peer communication device.

* * * * *